US012486228B2

(12) United States Patent
Thakur et al.

(10) Patent No.: US 12,486,228 B2
(45) Date of Patent: Dec. 2, 2025

(54) N-SUBSTITUTED INDOLES AND USE AS ALLOSTERIC MODULATORS OF CANNABINOID RECEPTORS

(71) Applicant: Northeastern University, Boston, MA (US)

(72) Inventors: Ganeshsingh A. Thakur, Cambridge, MA (US); Sumanta Garai, Jamaica Plain, MA (US)

(73) Assignee: Northeastern University, Boston, MA (US)

( * ) Notice: Subject to any disclaimer, the term of this patent is extended or adjusted under 35 U.S.C. 154(b) by 183 days.

(21) Appl. No.: 17/054,056

(22) PCT Filed: Jun. 26, 2019

(86) PCT No.: PCT/US2019/039354
§ 371 (c)(1),
(2) Date: Nov. 9, 2020

(87) PCT Pub. No.: WO2020/006152
PCT Pub. Date: Jan. 2, 2020

(65) Prior Publication Data
US 2021/0355084 A1 Nov. 18, 2021

Related U.S. Application Data

(60) Provisional application No. 62/690,317, filed on Jun. 26, 2018.

(51) Int. Cl.
*C07D 209/12* (2006.01)
*A61P 27/06* (2006.01)
*C07D 209/18* (2006.01)
*C07D 401/04* (2006.01)
*C07D 403/06* (2006.01)
*C07D 409/04* (2006.01)
*C07D 417/04* (2006.01)

(52) U.S. Cl.
CPC ............ *C07D 209/12* (2013.01); *A61P 27/06* (2018.01); *C07D 209/18* (2013.01); *C07D 401/04* (2013.01); *C07D 403/06* (2013.01); *C07D 409/04* (2013.01); *C07D 417/04* (2013.01)

(58) Field of Classification Search
CPC .. C07D 401/04; C07D 409/04; C07D 417/04; C07D 209/24; C07D 209/12; C07D 209/18; C07D 209/22; C07D 209/26; C07D 403/06; A61K 31/4439; A61K 31/4045; A61K 31/404; A61P 27/02; A61P 27/06
USPC ...... 546/277.4; 548/204, 494; 514/339, 414, 514/419
See application file for complete search history.

(56) References Cited

U.S. PATENT DOCUMENTS

2015/0005346 A1   1/2015   Thakur et al.

FOREIGN PATENT DOCUMENTS

| CN | 108101830 | * | 8/2019 | ........... C07D 209/34 |
| DE | 2740853 A1 | | 3/1979 | |
| JP | WO2007040166 | * | 12/2007 | ........... C07D 209/12 |
| WO | 2008/100867 A2 | | 8/2008 | |
| WO | 2012/088469 A1 | | 6/2012 | |
| WO | 2013/103967 A1 | | 7/2013 | |
| WO | 2016/029310 A1 | | 3/2016 | |
| WO | 2019/088910 A1 | | 5/2019 | |

OTHER PUBLICATIONS

Yadav, et al., Letters in Organic Chemistry (2008), 5(6), 455-460. (Year: 2008).*
Wang, et al., Chemistry—A European Journal (2008), 14(27), 8353-8364. (Year: 2008).*
Tian, et al., Synlett (2009), (13), 2115-2118. (Year: 2009).*
Liu, et al., Tetrahedron: Asymmetry (2011), 22(5), 550-557. (Year: 2011).*
Moriya, et al., Synthesis (1980), (9), 728-30. (Year: 1980).*
Grumbach, et al., Synthesis (1996), (7), 883-887. (Year: 1996).*
Takenaka, et al., Journal of the American Chemical Society (2007), 129(4), 742-743. (Year: 2007).*
Zhao, et al., Organic Letters (2007), 9(25), 5263-5266. (Year: 2007).*
Wang, et al., Chemistry—A European Journal (2008), 14(7), 8353-8364. (Year: 2008).*
CAS Registry File (1171755-46-6, obtained from the internet Feb. 12, 2025, entered into STN Aug. 2, 2009) (Year: 2009).*
PUBCHEM-CID: 42774242, Create date: Jul. 20, 2009, pp. 1-5.
Price, M.R. et al., "Allosteric Modulation of the Cannabinoid CB1 Receptor", Molecular Pharmacology, 2005, vol. 68, No. 5, pp. 1484-1495, DOI: 10.1124/mol. 105.016162.
Ling, A. et al., "PY-GC/MS investigation for cracking of solid waste from turmeric industry", Jan. 1, 2010, XP055887509, 1 pg., Database accession No. 2010:1214549.
Emmett, M.R., et al., "Nucleophilic Ring Opening of Cyclopropane Hemimalonates Using Internal Bronsted Acid Activation", Organic Letters, vol. 13, No. 16, Jul. 18, 2011, pp. 4180-4183.
Karmakar, R. et al., "Ag(I)-Catalyzed Indolization/C3-Functionalization Cascade of 2-Ethynylanilines via Ring Opening of Donor-Acceptor Cyclopropanes", Organic Letters, vol. 18, No. 11, May 17, 2016, pp. 2636-2639.
Irwin, L. et al., "Nucleophilic Opening of Donor-Acceptor Cyclopropanes with Indoles via Hydrogen Bond Activation with 1,1,1,3,3,3-Hexafluoroisopropanol", The Journal of Organic Chemistry, vol. 83, No. 11, May 14, 2018, pp. 6235-6242.

(Continued)

*Primary Examiner* — Jeffrey H Murray
*Assistant Examiner* — Daniel John Burkett
(74) *Attorney, Agent, or Firm* — Verrill Dana, LLP

(57) ABSTRACT

Heteroaromatic compounds are provided which are allosteric modulators of the cannabinoid receptors and which are useful for the treatment of glaucoma, pain, neuropathic pain, post-traumatic stress disorder (PTSD), and neurodegenerative diseases such as Huntington's disease, Alzheimer's disease, Parkinson's disease, multiple sclerosis, and other diseases where cannabinoid receptors are involved.

19 Claims, 4 Drawing Sheets

(56) References Cited

OTHER PUBLICATIONS

Bahuguna, A. et al., "Exploration of Aberrant Behaviour of Grignard Reagents with Indole-3-carboxaldehyde: Application to the Synthesis of Turbomycin B and Vibrindole A Derivatives", Synlett, vol. 28, No. 1, Sep. 14, 2016, pp. 117-121.

Kerr, J.R. et al., "Crystal structures of four indole derivatives as possible cannabinoid allosteric antagonists, Acta Crystallographica Section E Crystallographic Communications", vol. 71, No. 6, May 20, 2015, pp. 654-659.

* cited by examiner

3A

3B

N-SUBSTITUTED INDOLES AND USE AS ALLOSTERIC MODULATORS OF CANNABINOID RECEPTORS

CROSS-REFERENCE TO RELATED PATENT APPLICATIONS

This application claims priority to U.S. Provisional Patent Application No. 62/690,317, filed Jun. 26, 2018, the disclosure of which is hereby incorporated by reference in its entirety.

STATEMENT REGARDING FEDERALLY SPONSORED RESEARCH OR DEVELOPMENT

This invention was made with government support under Grant No. NEI RO1 EY024717 awarded by the National Institutes of Health. The government has certain rights in the invention.

BACKGROUND

The cannabinoid CB1 receptor is abundant in the central nervous system and regulates key physiological processes. (Caitlin E. Scott and Debra A Kendall, *Methods in Enzymology* Volume 593, 2017, Pages 317-342). It is activated by the endogenous ligands (e.g., anandamide) and also by synthetic ligands including 49-tetrahydrocannabinol, the psychoactive component of *Cannabis sativa*. These CB1 ligands are orthosteric and target the endogenous ligand-binding site of CB1. Allosteric modulators of CB1 receptor are also known (Paula Morales et al., *Cannabis and Cannabinoid Research*, Volume 1.1, 2016, pages 22-30). Allosteric modulators bind to topographically distinct sites and can noncompetitively impact the potency and efficacy of orthosteric compounds. Positive allosteric modulators (PAMs) activate whereas negative allosteric modulators (NAMs) inhibit receptor signaling.

The CB1 receptor is implicated in several diseases and conditions including, pain, and neurodegenerative disorders. As such, therapeutics that selectively target this receptor are of significant interest. In this regard, allosteric modulation of CB1 is advantageous as it offers more precise control of downstream pathways and potential circumvention of unwanted side effects.

Between 2001 and 2017, the cost of US opioid crisis (lost wages, lost productivity, health care costs etc.) was estimated to have exceeded $1 Trillion (https://altarum.org/news/economic-toll-opioid-crisis-us-exceeded-1-trillion-2001). Thus, there is an urgent need for developing non-addictive, effective and safer medications for treating pain, chronic pain as well as neuropathic and inflammatory pain. PAMs acting at CB1 receptors can provide a safer and effective alternative to opioid analgesics.

CB1 PAMs can also be effective in treating PTSD. An estimated 8% of Americans (24.4 million) have PTSD at any given time costing annually over ~42.2 billion dollars (www.ptsdunited.org/ptsd-statistics-2/). According to the VA (Veterans administrations), experts estimate that up to 20% of Operation Enduring Freedom and Operation Iraqi Freedom veterans, up to 10% of Gulf War veterans, and up to 30% of Vietnam War veterans have experienced PTSD. Consequently, demand for PTSD treatment continues to grow.

There is a need for new allosteric modulators that can better function as drugs to provide relief in diseases and conditions where cannabinoid receptors play a role.

SUMMARY

Described herein are compounds that are positive allosteric modulators of the CB1 cannabinoid receptor that have better druggability (i.e., have higher solubility, plasma stability, and oral bioavailability) than previously described CB1 PAMs. These compounds constitute a novel class of compounds containing indole functionality and have robust PAM activity. GAT1102 is a representative compound of this class and was shown to be effective as a CB1 ago-PAM in cellular assays and in electrophysiological experiments and was found to be effective also in lowering intra ocular pressure in an animal model, thereby demonstrating utility in treating glaucoma. In addition to CB1PAM/ago-PAM activity, some of these compounds can also act as CB2 agonists, inverse agonist and PAMs. Additionally, the CB1 PAMs disclosed herein and their prodrugs have utility in treating pain, neuropathic pain, epilepsy, ocular disorders including glaucoma, and neurodegenerative disorders such as Huntington's disease, Alzheimer's disease, Parkinson's disease, and multiple sclerosis.

Accordingly, in one aspect, the compound shown below is provided.

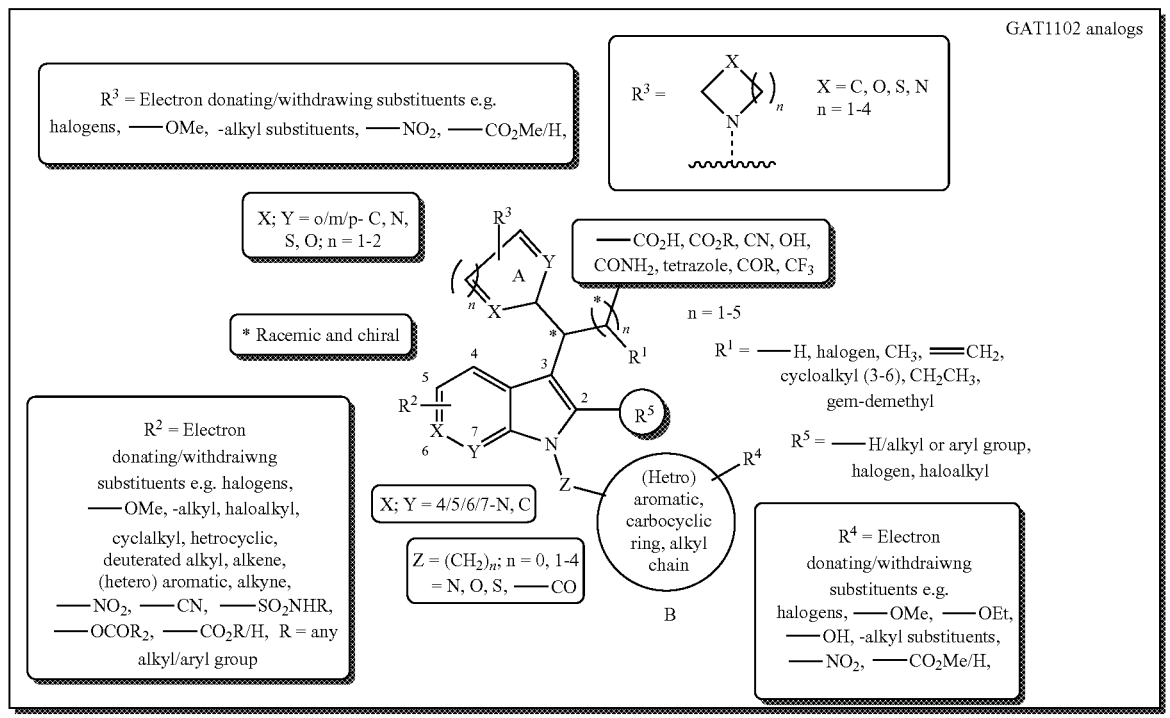

In another aspect, the compound shown in Formula I below is provided:

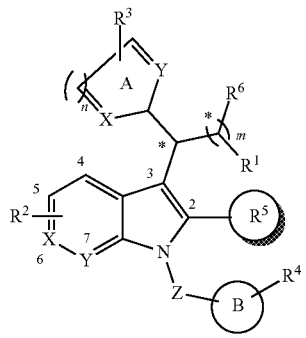

Formula I

In the compound of Formula I,
X and Y are independently N or C at any of positions 4, 5, 6, and/or 7;
Z is an alkyl spacer, $(CH_2)_k$, optionally substituted and optionally including N, O, S, or a carbonyl group in the chain, and k is 0 to 4;
A is a saturated or unsaturated carbocyclic or heterocyclic ring, the heteroatom(s) being N, S, or O in any combination, and n is 1 or 2; A also can be a 5 or 6 membered substituted or unsubstituted hetero(aromatic) ring;
B is a substituted or unsubstituted carbocyclic, bicyclic, (hetero)aromatic, or heterocyclic ring, preferably a 3 to 10 membered ring, a 4 to 7 membered ring, or a 5 to 6 membered ring;
$R^1$ is H, alkyl, optionally substituted, $=CH_2$, $(CHR)_x$ $CO_2R$, or $(CH_2)_xOH$, wherein each R is independently H or an alkyl, optionally substituted, and x is 0 to 5;
$R^2$ and $R^4$ are independently H, halogen, alkoxy, OH, alkyl, haloalkyl, optionally substituted, alkyne, $NO_2$, CN, $CO_2R$, $NR_2$, a deuterated alkyl group, a five- or six-membered heterocyclic ring, a (hetero)aromatic ring, or $SO_2NHR$, wherein R is independently H or alkyl, optionally substituted;
$R^3$ is independently H, halogen, alkoxy, OH, alkyl optionally substituted, alkyne, $NO_2$, CN, $CO_2R$, a three to six membered heterocyclic ring containing N and optionally an O or S, or $SO_2NHR$, wherein R is independently H or alkyl, optionally substituted;
$R^5$ is H, halogen, alkyl, optionally substituted, or aryl;
$R^6$ is $(CHR^7)_pCO_2R^7$; CN; OH; $CONH_2$; alkyl, optionally substituted (e.g., $CF_3$), $CONR^7R^8$; aryl; heterocyclic ring; $CH=CHCO_2R^7$; or $(CHR^7)_yCOR^7$; wherein $R^7$ and $R^8$, including each of $R^7$, is independently H or alkyl, optionally substituted, and p and y are each 0 to 4;
* represents a chiral center; and
m is 0 to 5.

In another aspect, a composition comprising a compound of Formula I is provided.

In yet another aspect, a pharmaceutical composition comprising a compound of Formula I and one or more excipients is provided.

Further, in one aspect, a method of treating a medical condition selected from the group consisting of glaucoma, post-traumatic stress disorder, epilepsy, pain, neuropathic pain, a neurodegenerative disease, Huntington's disease, Alzheimer's disease, or Parkinson's disease is provided. The method comprises administering to a subject in need thereof an effective amount of the compound of Formula I, the composition comprising a compound of Formula I, or the pharmaceutical composition comprising a compound of Formula I. In one embodiment, the medical condition is glaucoma.

BRIEF DESCRIPTION OF THE DRAWINGS

FIG. 2A shows averaged direct inhibition of excitatory postsynaptic currents (EPSCs) upon applying 1 µM GAT1102. FIG. 2B shows depolarization response curves before and after GAT1102 treatment. FIG. 2C shows sample DSE (depolarization-induced suppression of excitation) time course from a cell showing an enhanced DSE inhibition after GAT1102 treatment, which is consistent with a PAM-like response.

FIG. 3A shows that the TOP-lowering effect of sub-threshold WIN55,212-2 (WIN) is potentiated by the GAT1102 in normotensive C57Bl/6J mice. IOP was significantly lower in eyes receiving 0.2% GAT1102 combined with subthreshold 0.25% WIN at 6 and 12 hrs after topical administration compared to vehicle (n=5). FIG. 3B shows that GAT1102 (0.2%) significantly decreased IOP in ocular hypertensive nee mice at 1 and 12 hrs after topical administration (n=6). Values are represented as a change in IOP from the baseline (time 0). Paired t-tests, P<0.05.

DETAILED DESCRIPTION

A novel class of positive allosteric modulators of the CB1 cannabinoid receptor is provided. GAT1102 is a representative member of this class. Relative to earlier 2-phenylindole class of PAMs, the PAMs described herein, having a 1-substituted indole template, are structurally distinct and more druggable (e.g., have improved solubility) and also provide opportunities for administration as a prodrug. Through further structural manipulations these PAMs can be made either more lipophilic and therefore more brain permeable for treating CNS disorders such as post-traumatic stress disorder (PTSD), epilepsy, and neurodegenerative diseases, or can be made more polar with their activity restricted to the periphery (and exhibiting no CNS activity).

The 1-substituted indole derivatives preferably contain an N-aryl indole moiety and an additional carboxylate functionality. The compounds have been found to act as CB1 PAMs through cellular and electrophysiological assays. The representative compound from this class, GAT1102, was shown to be effective in reducing intraocular pressure in an animal model and thus, can be useful in treating glaucoma.

The compounds described herein can act as positive allosteric modulators (PAMs) or allosteric agonist-Positive allosteric modulators (ago-PAMs) on the CB1 and/or CB2 cannabinoid receptors. The racemic compounds as well as enantiomers, prodrugs, and pharmaceutical formulations are contemplated as included in the present class of compounds.

Figure 1:
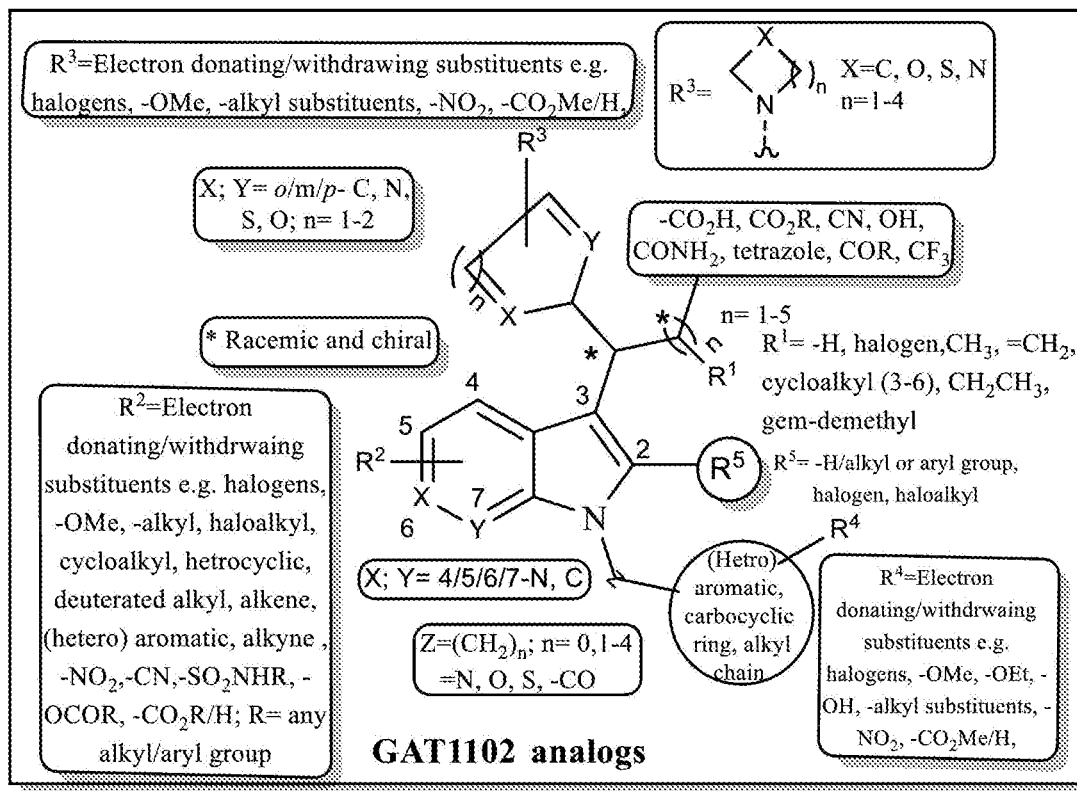
FIG. 1 is a schematic diagram of a genus of compounds encompassed by the present technology.

Referring to the schematic diagram shown in FIG. 1, the compounds include all possible combinations of substituents as shown at the 1, 2, 3, 4, 5, 6, and 7, positions including all possible indicated variants for substituents $R^2$, $R^3$, $R^4$, $R^5$, and $R^6$, as well as both racemic mixtures and both enantiomers at the indicated chiral centers. Compositions, including pharmaceutical compositions, containing any of these compounds or combinations thereof are also contemplated herein as also the use of any of these compounds, compositions, and pharmaceutical compositions in treating, or to prepare a medicament for use in treating, glaucoma, pain, neuropathic pain, epilepsy, and neurodegenerative disorders such as Huntington's disease, Alzheimer's disease, Parkinson's disease, and multiple sclerosis.

Definitions

Terms listed below, when used in the present specification, will have the meaning as described below. The initial definition provided for a group or term herein applies to that group or term throughout the present specification individually or as part of another group, unless otherwise indicated.

The terms "alkyl" and "alk" refer to a straight or branched chain alkane (hydrocarbon) radical containing from 1 to 12 carbon atoms, preferably 1 to 6 carbon atoms. Exemplary "alkyl" groups include methyl, ethyl, propyl, isopropyl, n-butyl, t-butyl, isobutyl pentyl, hexyl, isohexyl, heptyl, 4,4-dimethylpentyl, octyl, 2,2,4-trimethylpentyl, nonyl, decyl, undecyl, dodecyl, and the like. The term "$(C_1-C_4)$ alkyl" refers to a straight or branched chain alkane (hydrocarbon) radical containing from 1 to 4 carbon atoms, such as methyl, ethyl, propyl, isopropyl, n-butyl, t-butyl, and isobutyl. The term "$(C_1-C_6)$alkyl" refers to a straight or branched chain alkane (hydrocarbon) radical containing from 1 to 6 carbon atoms, such as n-hexyl, 2-methylpentyl, 3-methylpentyl, 4-methylpentyl, 2,3-dimethylbutyl, 2,2-dimethylbutyl, in addition to those exemplified for "$(C_1-C_4)$ alkyl." "Substituted alkyl" refers to an alkyl group substituted with one or more substituents, preferably 1 to 4 substituents, at any available point of attachment. Exemplary substituents include but are not limited to one or more of the following groups: hydrogen, halogen (e.g., a single halogen substituent or multiple halo substituents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. In the aforementioned exemplary substitutents, groups such as alkyl, cycloalkyl, alkenyl, alkynyl, cycloalkenyl, heterocycle and aryl can themselves be optionally substituted.

The term "alkoxy" refers to a group containing an alkyl group bonded to an oxygen atom.

The term "alkenyl" refers to a straight or branched chain hydrocarbon radical containing from 2 to 12 carbon atoms and at least one carbon-carbon double bond. Exemplaries of such groups include ethenyl or allyl. The term "$C_2-C_6$ alkenyl" refers to a straight or branched chain hydrocarbon radical containing from 2 to 6 carbon atoms and at least one carbon-carbon double bond, such as ethylenyl, propenyl, 2-propenyl, (E)-but-2-enyl, (Z)-but-2-enyl, 2-methy(E)-but-2-enyl, 2-methy(Z)-but-2-enyl, 2,3-dimethyl-but-2-enyl, (Z)-pent-2-enyl, (E)-pent-1-enyl, (Z)-hex-1-enyl, (E)-pent-2-enyl, (Z)-hex-2-enyl, (E)-hex-2-enyl, (Z)-hex-1-enyl, (E)-hex-1-enyl, (Z)-hex-3-enyl, (E)-hex-3-enyl, and (E)-hex-1,3-dienyl. "Substituted alkenyl" refers to an alkenyl group substituted with one or more substituents, preferably 1 to 4 substituents, at any available point of attachment. Exemplary substituents include but are not limited to one or more of the following groups: hydrogen, halogen (e.g., a single halogen substituent or multiple halo substituents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substitutents can themselves be optionally substituted.

The term "alkynyl" refers to a straight or branched chain hydrocarbon radical containing from 2 to 12 carbon atoms and at least one carbon to carbon triple bond. An exemplary of such groups includes ethynyl. The term "$C_2$-$C_6$ alkynyl" refers to a straight or branched chain hydrocarbon radical containing from 2 to 6 carbon atoms and at least one carbon-carbon triple bond, such as ethynyl, prop-1-ynyl, prop-2-ynyl, but-1-ynyl, but-2-ynyl, pent-1-ynyl, pent-2-ynyl, hex-1-ynyl, hex-2-ynyl, hex-3-ynyl. "Substituted alkynyl" refers to an alkynyl group substituted with one or more substituents, preferably 1 to 4 substituents, at any available point of attachment. Exemplary substituents include but are not limited to one or more of the following groups: hydrogen, halogen (e.g., a single halogen substituent or multiple halo substitutents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substitutents can themselves be optionally substituted.

The term "cycloalkyl" refers to a fully saturated cyclic hydrocarbon group containing from 1 to 4 rings and 3 to 8 carbons per ring. "$C_3$-$C_7$ cycloalkyl" refers to cyclopropyl, cyclobutyl, cyclopentyl, cyclohexyl, or cycloheptyl. "Substituted cycloalkyl" refers to a cycloalkyl group substituted with one or more substituents, preferably 1 to 4 substituents, at any available point of attachment. Exemplary substituents include but are not limited to one or more of the following groups: hydrogen, halogen (e.g., a single halogen substituent or multiple halo substitutents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substitutents can themselves be optionally substituted. Exemplary substituents also include spiro-attached or fused cyclic substituents, especially spiro-attached cycloalkyl, spiro-attached cycloalkenyl, spiro-attached heterocycle (excluding heteroaryl), fused cycloalkyl, fused cycloalkenyl, fused heterocycle, or fused aryl, where the aforementioned cycloalkyl, cycloalkenyl, heterocycle and aryl substituents can themselves be optionally substituted.

The term "cycloalkenyl" refers to a partially unsaturated cyclic hydrocarbon group containing 1 to 4 rings and 3 to 8 carbons per ring. Exemplaries of such groups include cyclobutenyl, cyclopentenyl, cyclohexenyl, etc. "Substituted cycloalkenyl" refers to a cycloalkenyl group substituted with one more substituents, preferably 1 to 4 substituents, at any available point of attachment. Exemplary substituents include but are not limited to one or more of the following groups: hydrogen, halogen (e.g., a single halogen substituent or multiple halo substituents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substitutents can themselves be optionally substituted. Exemplary substituents also include spiro-attached or fused cylic substituents, especially spiro-attached cycloalkyl, spiro-attached cycloalkenyl, spiro-attached heterocycle (excluding heteroaryl), fused cycloalkyl, fused cycloalkenyl, fused heterocycle, or fused aryl, where the aforementioned cycloalkyl, cycloalkenyl, heterocycle and aryl substituents can themselves be optionally substituted.

The term "aryl" refers to cyclic, aromatic hydrocarbon groups that have 1 to 5 aromatic rings, especially monocyclic or bicyclic groups such as phenyl, biphenyl or naphthyl. Where containing two or more aromatic rings (bicyclic, etc.), the aromatic rings of the aryl group may be joined at a single point (e.g., biphenyl), or fused (e.g., naphthyl, phenanthrenyl and the like). "Substituted aryl" refers to an aryl group substituted by one or more substituents, preferably 1 to 3 substituents, at any available point of attachment. Exemplary substituents include but are not limited to one or more of the following groups: hydrogen, halogen (e.g., a single halogen substituent or multiple halo substitutents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_c$, $NR_bC(=O)OR_e$, $NR_dC(=O)NR_bR_c$, $NR_dS(=O)_2NR_bR_c$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_e$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substituents can themselves be optionally substituted. Exemplary substituents also include fused cylic groups, especially fused cycloalkyl, fused cycloalkenyl, fused heterocycle, or fused aryl, where the aforementioned cycloalkyl, cycloalkenyl, heterocycle and aryl substituents can themselves be optionally substituted.

The terms "heterocycle" and "heterocyclic" refer to fully saturated, or partially or fully unsaturated, including aromatic (i.e., "heteroaryl") cyclic groups (for example, 4 to 7 membered monocyclic, 7 to 11 membered bicyclic, or 8 to 16 membered tricyclic ring systems) which have at least one heteroatom in at least one carbon atom-containing ring. Each ring of the heterocyclic group containing a heteroatom may have 1, 2, 3, or 4 heteroatoms selected from nitrogen atoms, oxygen atoms and/or sulfur atoms, where the nitrogen and sulfur heteroatoms may optionally be oxidized and the nitrogen heteroatoms may optionally be quaternized. (The term "heteroarylium" refers to a heteroaryl group bearing a quaternary nitrogen atom and thus a positive charge.) The heterocyclic group may be attached to the remainder of the molecule at any heteroatom or carbon atom of the ring or ring system. Exemplary monocyclic heterocyclic groups include azetidinyl, pyrrolidinyl, pyrrolyl, pyrazolyl, oxetanyl, pyrazolinyl, imidazolyl, imidazolinyl, imidazolidinyl, oxazolyl, oxazolidinyl, isoxazolinyl, isoxazolyl, thiazolyl, thiadiazolyl, thiazolidinyl, isothiazolyl, isothiazolidinyl, furyl, tetrahydrofuryl, thienyl, oxadiazolyl, piperidinyl, piperazinyl, 2-oxopiperazinyl, 2-oxopiperidinyl, 2-oxopyrrolodinyl, 2-oxoazepinyl, azepinyl, hexahydrodiazepinyl, 4-piperidonyl, pyridyl, pyrazinyl, pyrimidinyl, pyridazinyl, triazinyl, triazolyl, tetrazolyl, tetrahydropyranyl, morpholinyl, thiamorpholinyl, thiamorpholinyl sulfoxide, thiamorpholinyl sulfone, 1,3-dioxolane and tetrahydro-1,1-dioxothienyl, and the like. Exemplary bicyclic heterocyclic groups include indolyl, isoindolyl, benzothiazolyl, benzoxazolyl, benzoxadiazolyl, benzothienyl, benzo[d][1,3]dioxolyl, 2,3-dihydrobenzo[b][1,4]dioxinyl, quinuclidinyl, quinolinyl, tetrahydroisoquinolinyl, isoquinolinyl, benzimidazolyl, benzopyranyl, indolizinyl, benzofuryl, benzofurazanyl, chromonyl, coumarinyl, benzopyranyl, cinnolinyl, quinoxalinyl, indazolyl, pyrrolopyridyl, furopyridinyl (such as furo[2,3-c]pyridinyl, furo[3,2-b]pyridinyl] or furo[2,3-b]pyridinyl), dihydroisoindolyl, dihydroquinazolinyl (such as 3,4-dihydro-4-oxo-quinazolinyl), triazinylazepinyl, tetrahydroquinolinyl and the like. Exemplary tricyclic heterocyclic groups include carbazolyl, benzidolyl, phenanthrolinyl, acridinyl, phenanthridinyl, xanthenyl and the like.

"Substituted heterocycle" and "substituted heterocyclic" (such as "substituted heteroaryl") refer to heterocycle or heterocyclic groups substituted with one or more substituents, preferably 1 to 4 substituents, at any available point of attachment. Exemplary substituents include but are not limited to one or more of the following groups: hydrogen, halogen (e.g., a single halogen substituent or multiple halo substitutents forming, in the latter case, groups such as $CF_3$ or an alkyl group bearing $Cl_3$), cyano, nitro, oxo (i.e., =O), $CF_3$, $OCF_3$, cycloalkyl, alkenyl, cycloalkenyl, alkynyl, heterocycle, aryl, $OR_a$, $SR_a$, $S(=O)R_e$, $S(=O)_2R_e$, $P(=O)_2R_e$, $S(=O)_2OR_e$, $P(=O)_2OR_e$, $NR_bR_c$, $NR_bS(=O)_2R_e$, $NR_bP(=O)_2R_e$, $S(=O)_2NR_bR_c$, $P(=O)_2NR_bR_c$, $C(=O)OR_d$, $C(=O)R_a$, $C(=O)NR_bR_c$, $OC(=O)R_a$, $OC(=O)NR_bR_e$, $NR_bC(=O)OR_e$, $NR_dC(=O)NR_bR_c$, $NR_dS(=O)_2NR_bR_e$, $NR_dP(=O)_2NR_bR_c$, $NR_bC(=O)R_a$, or $NR_bP(=O)_2R_e$, wherein each occurrence of $R_a$ is independently hydrogen, alkyl, cycloalkyl, alkenyl, cycloalkenyl, alkynyl, heterocycle, or aryl; each occurrence of $R_b$, $R_c$ and $R_d$ is independently hydrogen, alkyl, cycloalkyl, heterocycle, aryl, or said $R_b$ and $R_c$ together with the N to which they are bonded optionally form a heterocycle; and each occurrence of $R_e$ is independently alkyl, cycloalkyl, alkenyl, cycloalkenyl, alkynyl, heterocycle, or aryl. The exemplary substituents can themselves be optionally substituted. Exemplary substituents also include spiro-attached or fused cylic substituents at any available point or points of attachment, especially spiro-attached cycloalkyl, spiro-attached cycloalkenyl, spiro-attached heterocycle (excluding heteroaryl), fused cycloalkyl, fused cycloalkenyl, fused heterocycle, or fused aryl, where the aforementioned cycloalkyl, cycloalkenyl, heterocycle and aryl substituents can themselves be optionally substituted.

The term "alkylamino" refers to a group having the structure —NHR', wherein R' is hydrogen, alkyl or substituted alkyl, cycloalkyl or substituted cyclolakyl, as defined herein. Examples of alkylamino groups include, but are not limited to, methylamino, ethylamino, n-propylamino, isopropylamino, cyclopropylamino, n-butylamino, tert-butylamino, neopentylamino, n-pentylamino, hexylamino, cyclohexylamino, and the like.

The term "dialkylamino" refers to a group having the structure —NRR', wherein R and R' are each independently alkyl or substituted alkyl, cycloalkyl or substituted cycloalkyl, cycloalkenyl or substituted cyclolakenyl, aryl or substituted aryl, heterocylyl or substituted heterocyclyl, as defined herein. R and R' may be the same or different in an dialkyamino moiety. Examples of dialkylamino groups include, but are not limited to, dimethylamino, methyl ethylamino, diethylamino, methylpropylamino, di(n-propyl)amino, di(iso-propyl)amino, di(cyclopropyl)amino, di(n-butyl)amino, di(tert-butyl)amino, di(neopentyl)amino, di(n-pentyl)amino, di(hexyl)amino, di(cyclohexyl)amino, and the like. In certain embodiments, R and R' are linked to form a cyclic structure. The resulting cyclic structure may be aromatic or nonaromatic. Examples of cyclic diaminoalkyl groups include, but are not limited to, aziridinyl, pyrrolidinyl, piperidinyl, morpholinyl, pyrrolyl, imidazolyl, 1,3,4-trianolyl, and tetrazolyl. The terms "halogen" or "halo" refer to chlorine, bromine, fluorine or iodine.

Unless otherwise indicated, any heteroatom with unsatisfied valences is assumed to have hydrogen atoms sufficient to satisfy the valences.

The compounds of the present invention may form salts which are also within the scope of this invention. Reference to a compound of the present invention is understood to include reference to salts thereof, unless otherwise indicated.

The term "salt(s)," as employed herein, denotes acidic and/or basic salts formed with inorganic and/or organic acids and bases. In addition, when a compound of the present invention contains both a basic moiety, such as but not limited to a pyridine or imidazole, and an acidic moiety such as but not limited to a carboxylic acid, zwitterions ("inner salts") may be formed and are included within the term "salt(s)" as used herein. Pharmaceutically acceptable (i.e., non-toxic, physiologically acceptable) salts are preferred, although other salts are also useful, e.g., in isolation or purification steps which may be employed during preparation. Salts of a compound of the present invention may be formed, for example, by reacting a compound I with an amount of acid or base, such as an equivalent amount, in a medium such as one in which the salt precipitates or in an aqueous medium followed by lyophilization.

The compounds of the present invention which contain a basic moiety, such as but not limited to an amine or a pyridine or imidazole ring, may form salts with a variety of organic and inorganic acids. Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides, hydrobromides, hydroiodides, hydroxyethanesulfonates (e.g., 2-hydroxyethanesulfonates), lactates, maleates, methane sulfonates, naphthalenesulfonates (e.g., 2-naphthalenesulfonates), nicotinates, nitrates, oxalates, pectinates, persulfates, phenylpropionates (e.g., 3-phenylpropionates), phosphates, picrates, pivalates, propionates, salicylates, succinates, sulfates (such as those formed with sulfuric acid), sulfonates, tartrates, thiocyanates, toluenesulfonates such as tosylates, undecanoates, and the like.

Compounds of the present invention which contain an acidic moiety, such but not limited to a carboxylic acid, may form salts with a variety of organic and inorganic bases. Exemplary basic salts include ammonium salts, alkali metal salts such as sodium, lithium and potassium salts, alkaline earth metal salts such as calcium and magnesium salts, salts with organic bases (for example, organic amines) such as benzathines, dicyclohexylamines, hydrabamines (formed with N,N-bis(dehydroabietyl) ethylenediamine), N-methyl-D-glucamines, N-methyl-D-glycamides, t-butyl amines, and salts with amino acids such as arginine, lysine and the like. Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others.

Prodrugs and solvates of the compounds of the invention are also contemplated herein. The term "prodrug" as employed herein denotes a compound that, upon administration to a subject, undergoes chemical conversion by metabolic (e.g., enzymatic) or chemical processes to yield a compound of the present invention, or a salt and/or solvate thereof. Solvates of the compounds of the present invention include, for example, hydrates.

Compounds of the present invention, and salts or solvates thereof, may exist in their tautomeric form (for example, as an amide or imino ether). All such tautomeric forms are contemplated herein as part of the present invention.

All stereoisomers of the present compounds (for example, those which may exist due to asymmetric carbons on various substituents), including enantiomeric forms and diastereomeric forms, are contemplated within the scope of this invention. Individual stereoisomers of the compounds of the invention may, for example, be substantially free of other isomers (e.g., as a pure or substantially pure optical isomer having a specified activity, wherein "pure" can be, for example, at least 70% pure, 80% pure, 90% pure, 95% pure, 98% pure, or 99% pure), or may be admixed, for example, as racemates or with all other, or other selected, stereoisomers. The chiral centers of the present invention may have the S or R configuration as defined by the International Union of Pure and Applied Chemistry (IUPAC) 1974 Recommendations. The racemic forms can be resolved by physical methods, such as, for example, fractional crystallization, separation or crystallization of diastereomeric derivatives or separation by chiral column chromatography. The individual optical isomers can be obtained from the racemates by any suitable method, including without limitation, conventional methods, such as, for example, salt formation with an optically active acid followed by crystallization.

Compounds of the present invention are, subsequent to their preparation, preferably isolated and purified to obtain a composition containing an amount by weight equal to or greater than 90%, for example, equal to greater than 95%, equal to or greater than 99% pure ("substantially pure" compound I), which is then used or formulated as described herein. Such "substantially pure" compounds of the present invention are also contemplated herein as part of the present invention.

All configurational isomers of the compounds of the present invention are contemplated, either in admixture or in pure or substantially pure form. The definition of compounds of the present invention embraces both cis (Z) and trans (E) alkene isomers, as well as cis and trans isomers of cyclic hydrocarbon or heterocyclic rings.

Throughout the specifications, groups and substituents thereof may be chosen to provide stable moieties and compounds.

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ Ed, inside cover, and specific functional groups are generally defined as described therein. Additionally, general principles of organic chemistry, as well as specific functional moieties and reactivity, are described in "Organic Chemistry," Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The present invention also includes isotopically labeled compounds, which are identical to the compounds disclosed herein, but for the fact that one or more atoms are replaced by an atom having an atomic mass or mass number different from the atomic mass or mass number usually found in nature. Examples of isotopes that can be incorporated into compounds of the present invention include isotopes of hydrogen, carbon, nitrogen, oxygen, phosphorous, sulfur, fluorine and chlorine, such as $^2H$, $^3H$, $^{13}C$, $^{11}C$, $^{14}C$, $^{15}N$, $^{18}O$, $^{17}O$, $^{31}P$, $^{32}P$, $^{35}S$, $^{18}F$, and $^{36}Cl$, respectively. Compounds of the present invention, or an enantiomer, diastereomer, tautomer, or pharmaceutically acceptable salt or solvate thereof, which contain the aforementioned isotopes and/or other isotopes of other atoms are within the scope of this invention. Certain isotopically labeled compounds of the present invention, for example those into which radioactive isotopes such as $^3H$ and $^{14}C$ are incorporated, are useful in drug and/or substrate tissue distribution assays. Tritiated, i.e., $^3H$, and carbon-14, i.e., $^{14}C$, isotopes are particularly preferred for their ease of preparation and detectability. Further, substitution with heavier isotopes such as deuterium, i.e., $^2H$, can afford certain therapeutic advantages resulting from greater metabolic stability, for example increased in vivo half-life or reduced dosage requirements and, hence, may be preferred in some circumstances. Isotopically labeled compounds can generally be prepared by carrying out the procedures disclosed in the Schemes and/or in the Examples below, by substituting a readily available isotopically labeled reagent for a non-isotopically labeled reagent.

If a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

The compounds described herein may be substituted with any number of substituents or functional moieties. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. For purposes of this invention, heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful in the treatment, for example, of infectious diseases or proliferative disorders. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Method of Preparation of GAT1102 and Analogs

The synthesis of GAT 1102 was commenced with the epoxide ring opening of racemic styrene oxide with indole (1). The coupled product 2 was treated under standard Buchwald coupling reaction to get N-arylated compound 3 in quantitative yield. The hydroxyl functionality of compound 3 was oxidized with DMP and further treated two carbon Witting reaction condition to get unsaturated ester 5. The double bond of unsaturated ester was reduced under Raney Ni mediated hydrogenation reaction condition and finally ester was hydrolyzed to get acid, GAT1102 in good yield. This synthetic route can be potentially used for synthesizing GAT1102 analogs.

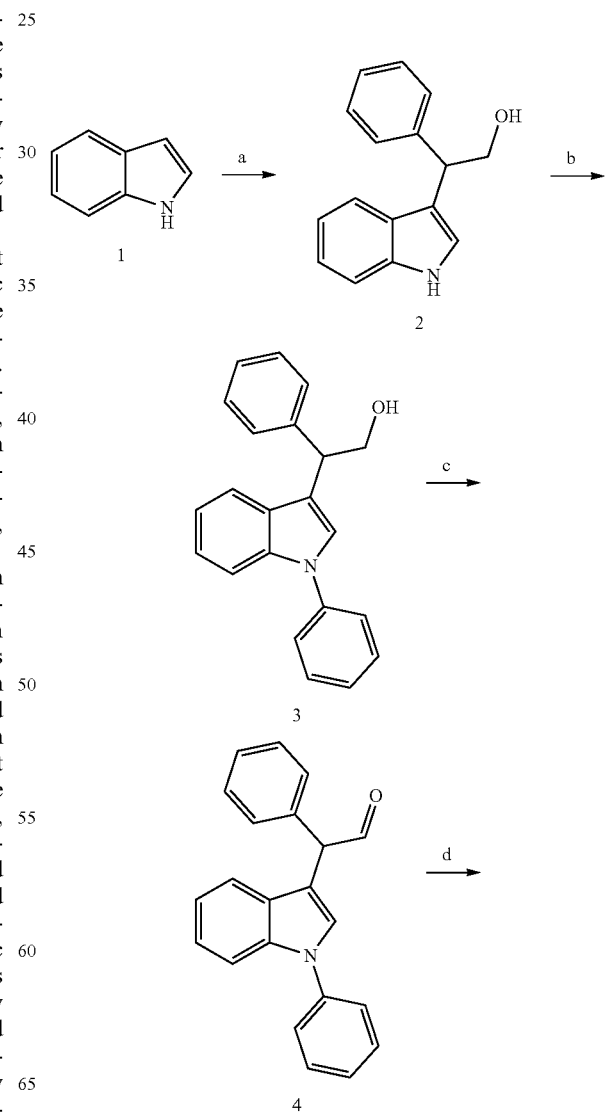

-continued

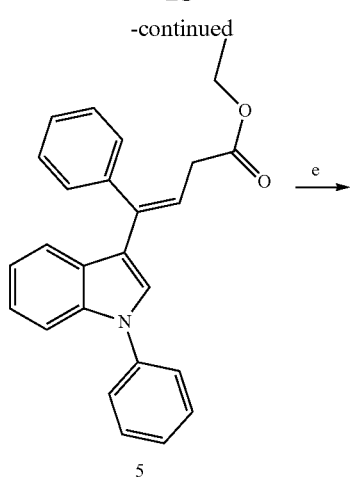

5

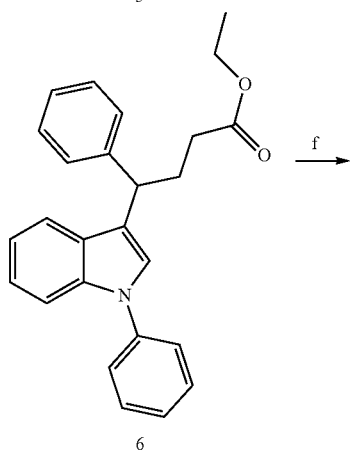

6

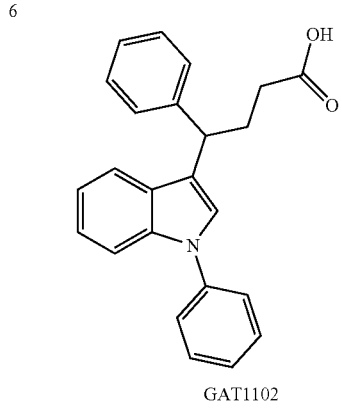

GAT1102

Reagents and conditions: a) (±)-styrene oxide, CF$_3$CF$_2$OH, reflux, 7 hrs, 72%; b) bromobenzene, CuI, K$_3$PO$_4$, trans-1,2-diaminocyclohexane, toluene, 120° C., 12 hrs, quant; c) DMP, DCM, 15 min, 44%; d) diethyl ethylphosphonate, NaH, 0° C. to rt, 72%; e) Raney Ni, H$_2$, MeOH, rt, 3 hrs, 98%; f) LiOH, THF:H$_2$O (9:1), 84%.

2-(1H-Indol-3-yl)-2-phenylethan-1-ol (2): Indole 1 (1 gm, 8.50 mmol) and (±)-styrene oxide (1.025 gm, 8.50 mmol) were dissolved in CF$_3$CH$_2$OH (10 mL) and refluxed at 100° C. for overnight. The reaction mixture was cooled to room temperature and the solvent was evaporated under reduced pressure then reaction mixture was purified by silica gel column chromatography to give pure coupled product 2 (1.46 gm, 72%) as a white solid.

2-Phenyl-2-(1-phenyl-1H-indol-3-yl)ethan-1-ol (3): 2-(1H-indol-3-yl)-2-phenylethan-1-ol, 2 (1 gm, 0.421 mol), bromobenzene (13.2 ml, 1.20 mol), potassium phosphate (2.12 gm, 1.68 mol), trans (±)-diamine cyclohexane (20 mol %) and CuI (5 mol %) were added to anhydrous toluene in 100 ml round bottom flask under inert atmosphere. The reaction mixture was refluxed at 120° C. for overnight. The reaction mixture was cooled, filtered through small pad of celite and residue was washed with ethyl acetate for 2-3 times then the mother liquor was concentrated under vacuum. Purification of the reaction mixture on a silica gel column using ethyl acetate/hexane (5:95) as eluent furnished the N-arylated compound, 3 (1.32 gm, quant.) as a colorless liquid.

2-Phenyl-2-(1-phenyl-1H-indol-3-yl)acetaldehyde (4): Dess Martin periodinane (4.06 gm, 9.59 mmol) was added to the stirred solution of alcohol, 3 (1 gm, 3.19 mmol) in DCM and further stirred for 15 min in room temperature. The reaction mixture was concentrated under vacuum and directly loaded for column. Purification of the reaction mixture on a silica gel column using ethyl acetate/hexane (4:96) as eluent furnished the aldehyde compound, 4(437 mg, 44%).

Ethyl 4-phenyl-4-(1-phenyl-1H-indol-3-yl)but-3-enoate (5): To a solution of phosphonate ester (863 mg, 3.85 mmol) in THF (10 mL) was added NaH (145 mg, 3.6 mmol, 60%) at 0° C. under inert atmosphere. After 30 min, a solution of 2-phenyl-2-(1-phenyl-1H-indol-3-yl)acetaldehyde, 4 (400 mg, 1.28 mmol) in THF (5 mL) was added to the mixture. The mixture was warmed to room temperature and stirred for overnight, quenched with saturated solution of NH$_4$Cl, extracted with ethyl acetate, washed with brine, dried over Na$_2$SO$_4$, filtered and concentrated in vacuum. Purification of the reaction mixture on a silica gel column using ethyl acetate/hexane (4:96) as eluent furnished the unsaturated ester, 5 (354 mg, 72%) as a colorless liquid.

Ethyl 4-phenyl-4-(1-phenyl-1H-indol-3-yl)butanoate (6): To a solution of unsaturated ester, 5 (300 mg, 0.787 mmol) in ethanol, catalytic amount Raney Ni was added and stirred overnight under H$_2$ atmosphere at room temperature. The reaction mixture was filtered through short celite pad and concentrated under vacuum. The saturated ester 6 (294 mg, 98%) was taken to the next step without further purification.

4-Phenyl-4-(1-phenyl-1H-indol-3-yl)butanoic acid (GAT 1102): Ester (200 mg, 0.520 mmol) was dissolved in 10 ml of THF:H$_2$O (9:1) and then LiOH (195 mg, 5.20 mmol) was added portion wise. The reaction mixture was stirred for overnight at RT. The reaction mixture was quenched by addition of 10% HCl solution and stirred for further 15 min. Then residue was dissolved in water and EtOAc was added to extract the product. The combined organic layer was washed with brine (7 mL) and dried over anhydrous Na$_2$SO$_4$, filtered, and concentrated under reduced pressure. Purification of the residue on a silica gel column using ethyl acetate/hexane as eluent furnished the acid, GAT1102 (158 mg, 84%) as a white solid. $^1$H NMR (CDCl$_3$, 500 MHz): δ 7.52 (d, J=8.1 Hz, 1H), 7.49-7.47 (m, 4H), 7.35-7.27 (m, 5H), 7.21-7.15 (m, 3H), 7.07-7.05 (m, 1H), 4.30 (t, J=8.7 Hz, 1H), 2.63-2.56 (m, 1H), 2.48-2.33 (m, 3H); MS-ESI (m/z) 356 [M+H]$^+$.

Compounds, Compositions and Methods of Use

Compounds and compositions and methods of treatment included in the present technology are summarized in the numbered embodiments below.

1. A compound having a structure according to Formula I

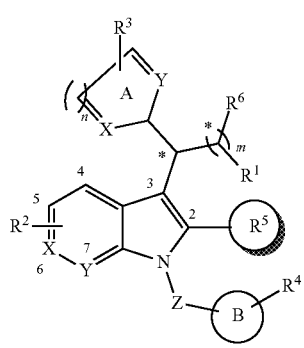

Formula I wherein
- Y is independently N or C;
- Z is an alkyl, optionally substituted, and optionally having N, O, or S in the chain; or a carbonyl; and k is a number from 0 to 4;
- A is a saturated or unsaturated carbocyclic or heterocyclic ring, the hetero atom being N, S, or O in any combination, and "n" is 1 or 2;
- B is a substituted or unsubstituted carbocyclic ring, bicyclic ring, aromatic ring, or heterocyclic ring;
- $R^1$ is H; alkyl, optionally substituted; $=CH_2$, $(CHR)_n O_2 R$, or $(CH_2)_n OH$, wherein each R is independently H or an alkyl, optionally substituted, and n is a number between 0 and 5;
- $R^2$ and $R^4$ are independently; H; halogen; alkoxy; OH; alkyl, optionally substituted; alkyne; $NO_2$; CN; $CO_2 R$; a five- or six-member heterocyclic ring; or $SO_2 NHR$; wherein R is independently H or alkyl, optionally substituted;
- $R^3$ is independently halogen; H; alkoxy; OH; alkyl, optionally substituted; alkyne; $NO_2$; CN; COX and Y are independently N or C at any of positions 4, 5, 6, and/or 7;
- Z is an alkyl spacer, $(CH_2)_k$, optionally substituted and optionally including N, O, S, or a carbonyl group in the chain, and k is 0 to 4;
- A is a saturated or unsaturated carbocyclic or heterocyclic ring, the heteroatom(s) being N, S, or O in any combination, and n is 1 or 2; A also can be a 5 or 6 membered substituted or unsubstituted hetero(aromatic) ring;
- B is a substituted or unsubstituted carbocyclic, bicyclic, (hetero)aromatic, or heterocyclic ring, preferably a 3 to 10 membered ring, a 4 to 7 membered ring, or a 5 to 6 membered ring;
- $R^1$ is H, alkyl, optionally substituted, $=CH_2$, $(CHR)_x CO_2 R$, or $(CH_2)_x OH$, wherein each R is independently H or an alkyl, optionally substituted, and x is 0 to 5;
- $R^2$ and $R^4$ are independently H, halogen, alkoxy, OH, alkyl, haloalkyl, optionally substituted, alkyne, $NO_2$, CN, $CO_2 R$, $NR_2$, a deuterated alkyl group, a five- or six-membered heterocyclic ring, a (hetero)aromatic ring, or $SO_2 NHR$, wherein R is independently H or alkyl, optionally substituted;
- $R^3$ is independently H, halogen, alkoxy, OH, alkyl optionally substituted, alkyne, $NO_2$, CN, $CO_2 R$, a three to six membered heterocyclic ring containing N and optionally an O or S, or $SO_2 NHR$, wherein R is independently H or alkyl, optionally substituted;
- $R^5$ is H, halogen, alkyl, optionally substituted, or aryl;
- $R^6$ is $(CHR^7)_p CO_2 R^7$; CN; OH; $CONH_2$; alkyl, optionally substituted (e.g., $CF_3$), $CONR^7 R^8$; aryl; heterocyclic ring; $CH=CHCO_2 R^7$; or $(CHR^7)_y COR^7$; wherein $R^7$ and $R^8$, including each of $R^7$, is independently H or alkyl, optionally substituted, and p and y are each 0 to 4;
- * represents a chiral center; and
- m is 0 to 5.

2. The compound of embodiment 1, wherein $R^6$ is $CO_2 H$.

3. The compound of embodiment 1, wherein $R^6$ is $CO_2 H$ and m is 1.

4. The compound of embodiment 1, wherein each of $R^1$ and $R^6$ is $CO_2 H$.

5. The compound of embodiment 1, wherein each of $R^1$ and $R^6$ is $CO_2 H$ and m is 1.

6. The compound of embodiment 1, wherein $R^1$ is $CH_2 OH$ and m is 1.

7. The compound of embodiment 1, wherein each of $R^1$ and $R^6$ is $CH_2 OH$ and m is 1.

8. The compound of embodiment 1, wherein $R^6$ is a heterocyclic ring.

9. The compound of embodiment 8, wherein the heterocyclic ring is tetrazole.

10. The compound of embodiment 1, wherein $R^6$ is $CH_2 COR^7$ and $R^7$ is alkyl and m is 1.

11. The compound of embodiment 10, wherein $R^1$ is H.

12. The compound of embodiment 10, wherein each of $R^1$ and $R^7$ is $CH_3$.

13. The compound of embodiment 1, wherein $R^3$ is piperidine, piperazine, or pyrrolidine.

14. The compound of embodiment 1 selected from the group consisting of

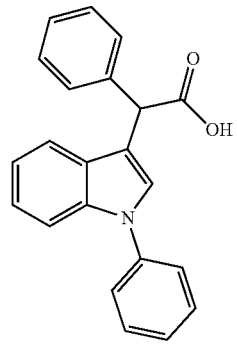

Compound 7

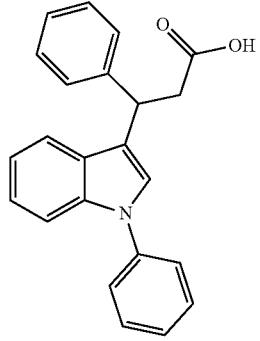

Compound 8

-continued
Compound 9
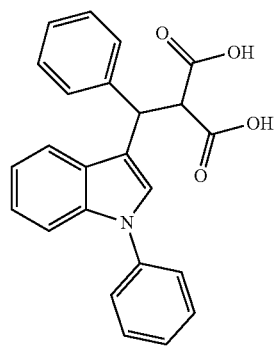
Compound 10
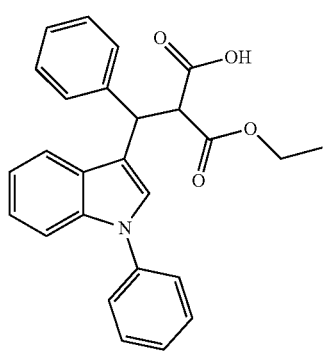
Compound 11
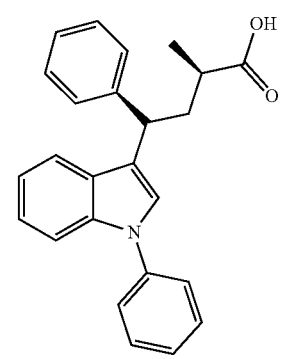
Compound 12
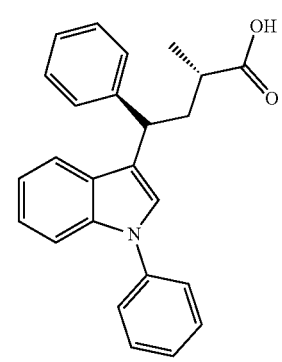
-continued
Compound 13
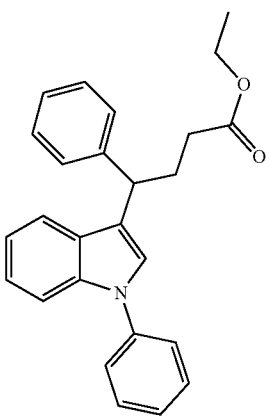
Compound 14
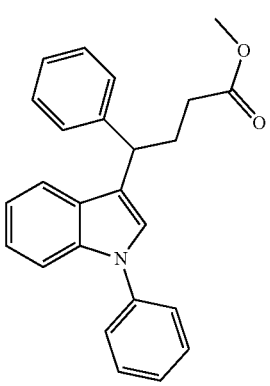
Compound 15
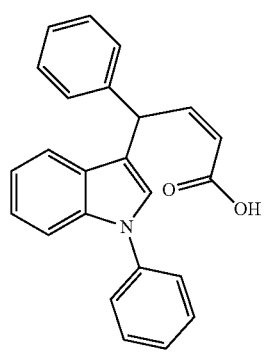
Compound 16
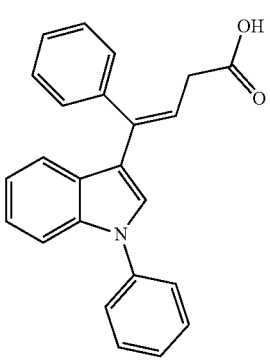

Compound 17
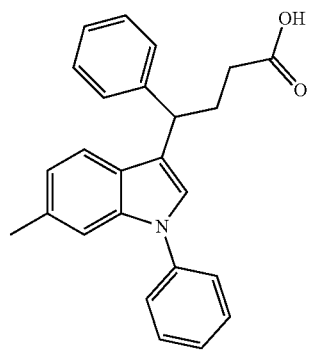
Compound 18
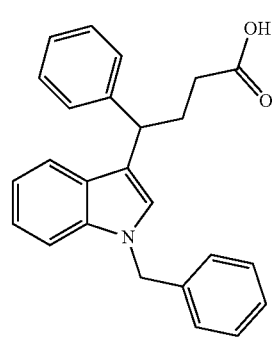
Compound 19
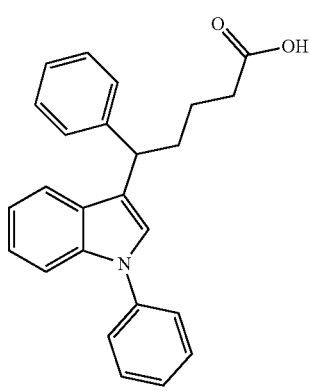
Compound 20
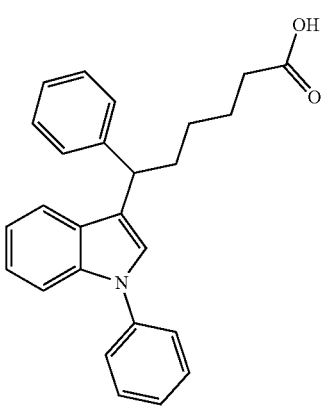
(+)-GAT1102
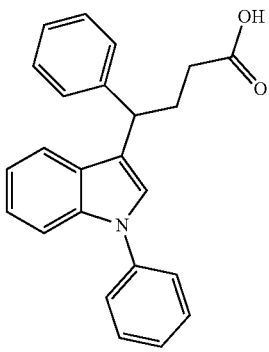
(−)-GAT1102
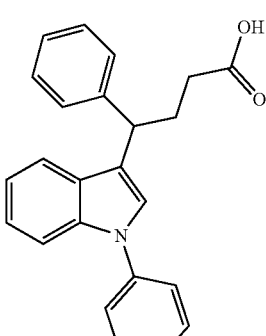
Compound 21
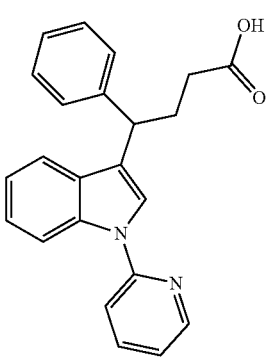
Compound 22
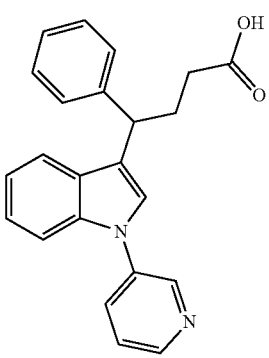

Compound 23
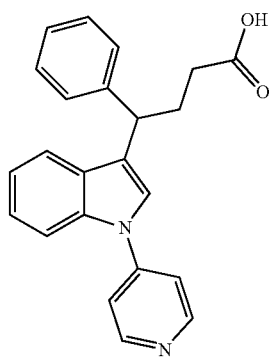
Compound 24
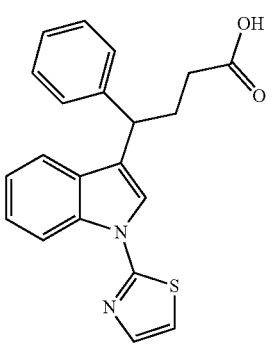 Compound 27
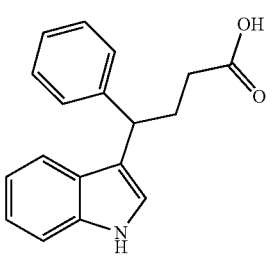 Compound 28
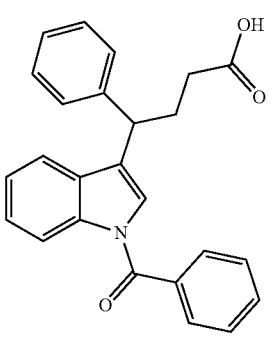 Compound 29
Compound 25
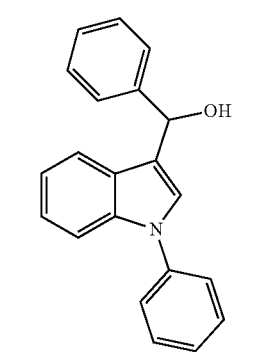 Compound 30
Compound 26
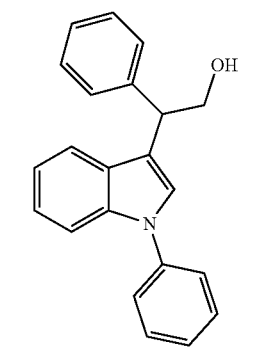 Compound 31

-continued
Compound 32
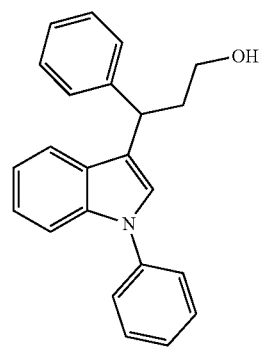
Compound 33
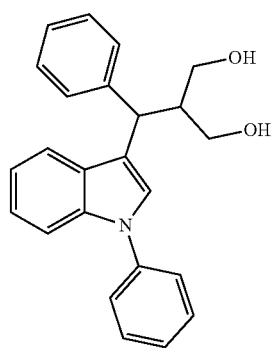
Compound 34
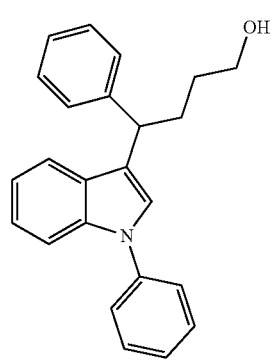
Compound 35
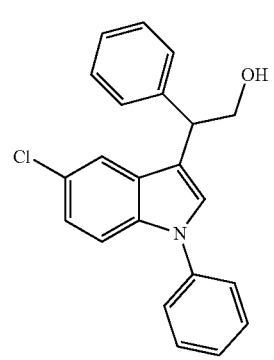
-continued
Compound 38
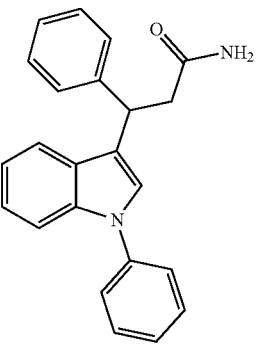
Compound 39
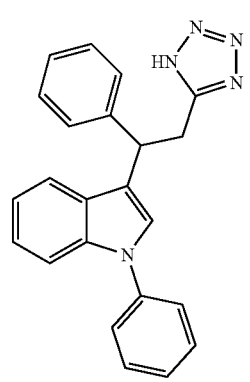
Compound 41
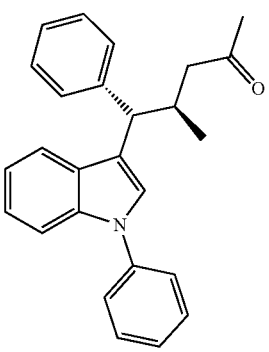
Compound 42
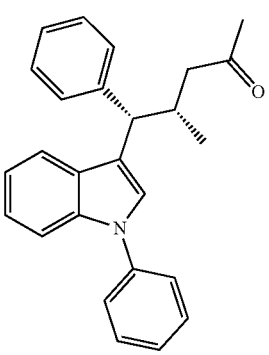
15. The compound of any of embodiments 1-14 that binds to a CB1 receptor.
16. The compound of any of embodiments 1-14 that binds to a CB2 receptor.
17. The compound of embodiments 15 or 16 that is a positive allosteric modulator.
18. A composition comprising a compound of any of embodiments 1-17.

19. A pharmaceutical composition comprising a compound of any of embodiments 1-17 and one or more excipients.

20. A method of treating a medical condition selected from the group consisting of glaucoma, post-traumatic stress disorder, epilepsy, pain, neuropathic pain, a neurodegenerative disease, Huntington's disease, Alzheimer's disease, or Parkinson's disease, the method comprising administering the compound of any of embodiments 1-17, the composition of embodiment 18, or the pharmaceutical composition of embodiment 19 to a subject in need thereof.

21. The method of embodiment 20, wherein the medical condition is glaucoma.

EXAMPLES

Example 1: Synthesis of GAT1102 Analogs

The following GAT1102 analogs were synthesized.

Compound 7

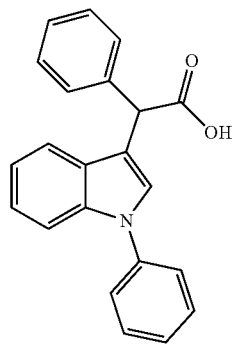

Compound 8

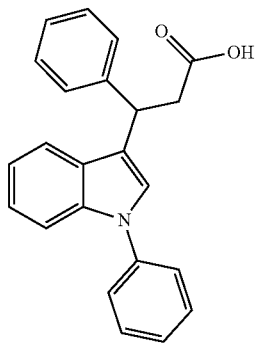

Compound 9

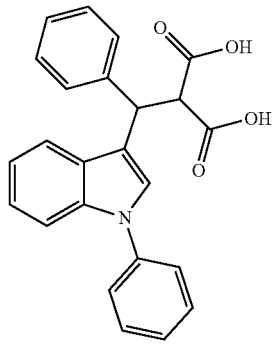

Compound 10

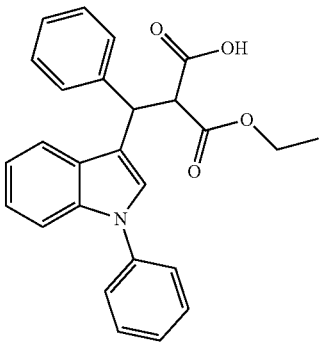

Compound 11

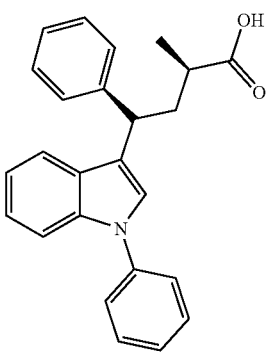

Compound 12

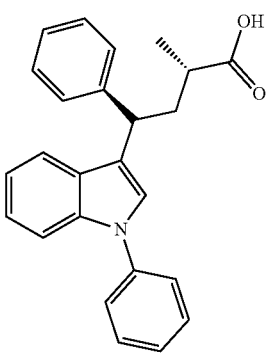

Compound 13

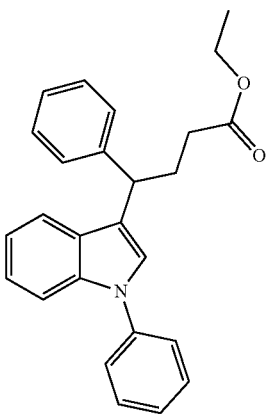

-continued
Compound 14
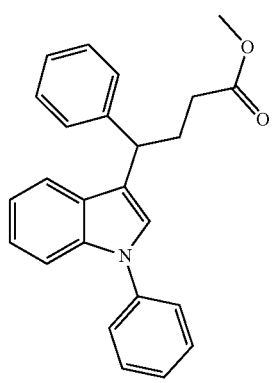
Compound 15
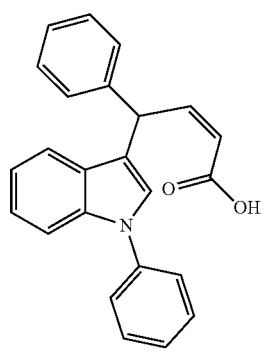
Compound 16
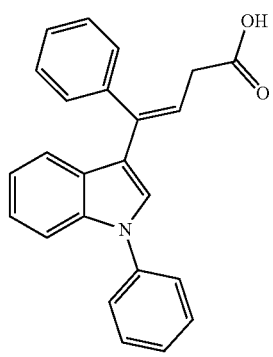
Compound 17
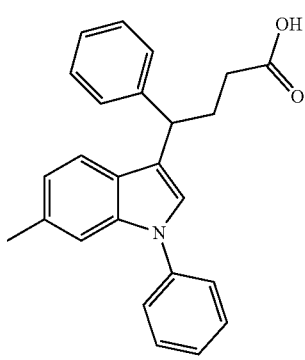
-continued
Compound 18
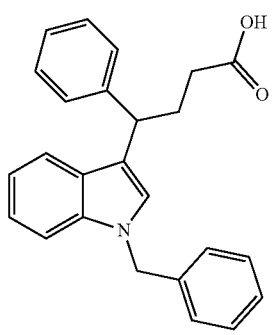
Compound 19
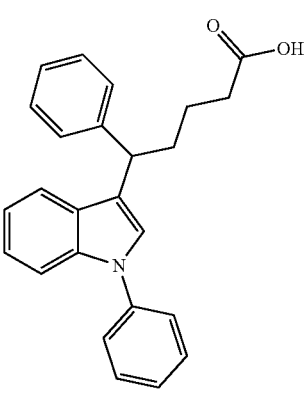
Compound 20
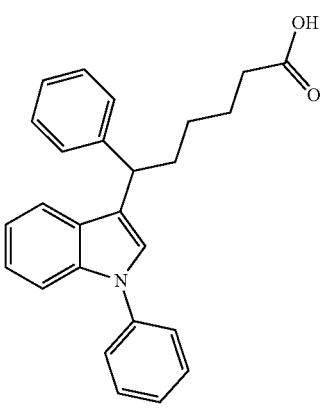
(+)-GAT1102
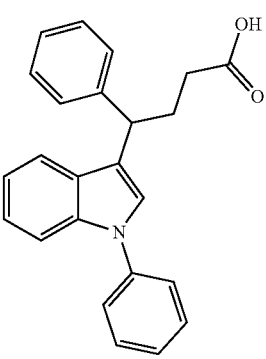

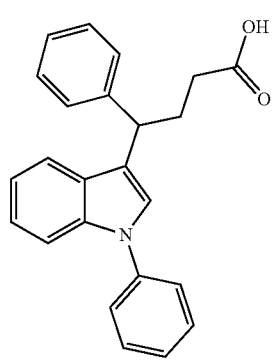
(-)-GAT1102
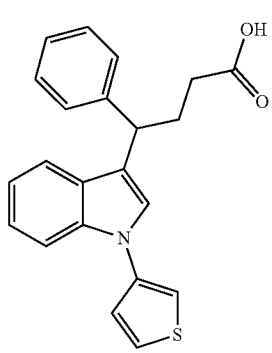
Compound 24
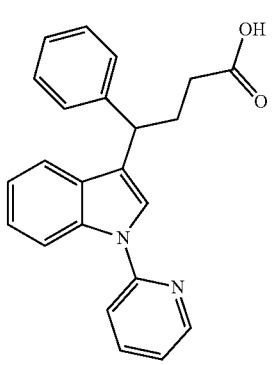
Compound 21
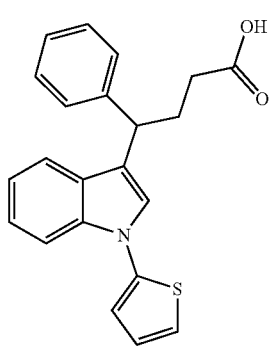
Compound 25
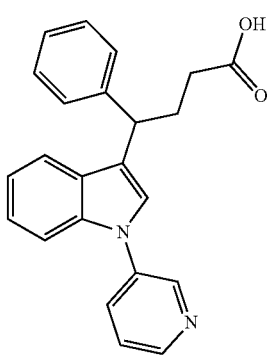
Compound 22
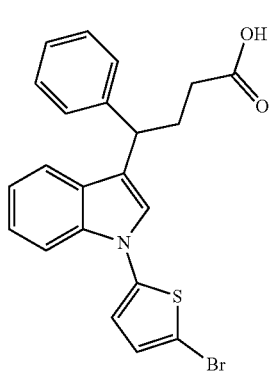
Compound 26
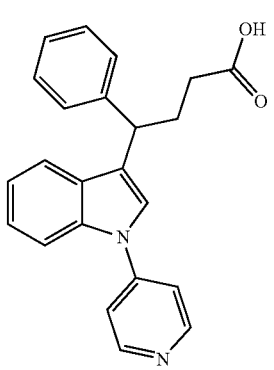
Compound 23
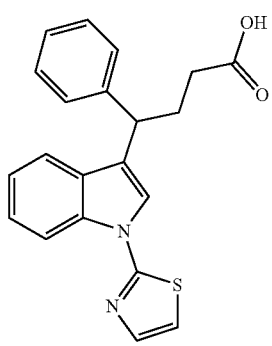
Compound 27
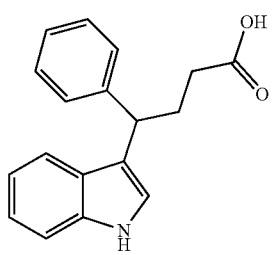
Compound 28

Compound 29
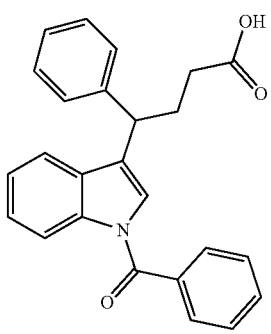
Compound 30
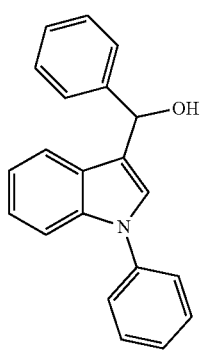
Compound 31
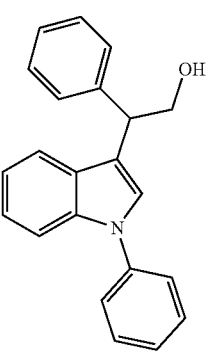
Compound 32
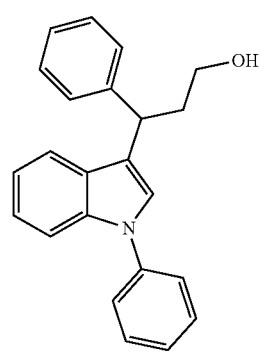
Compound 33
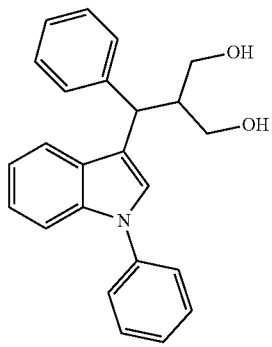
Compound 34
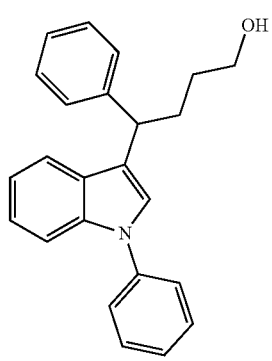
Compound 35
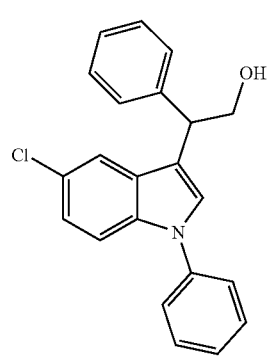
Compound 38
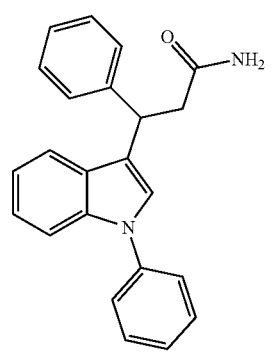

Compound 39

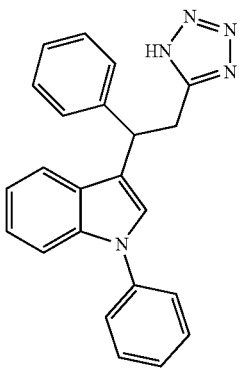

Compound 40

Compound 41

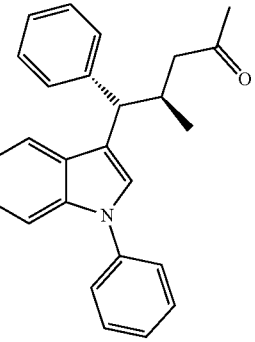

Compound 42

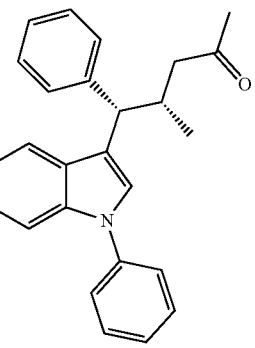

Example 2: Chemical Characterization of GAT1102 Analogs

NMR spectroscopic characterization of the synthesized GAT1102 analogs are provided below.

2-Phenyl-2-(1-phenyl-1H-indol-3-yl)acetic acid [Compound 7]: $^1$H NMR (CDCl$_3$, 500 MHz): δ 7.53 (dd, J=8.3, 1.0 Hz, 1H), 7.50-7.47 (m, 6H), 7.38 (s, 1H), 7.34-7.31 (m, 3H), 7.29-7.26 (m, 1H), 7.23-7.18 (m, 1H), 7.12-7.09 (m, 1H), 5.31 (s, 1H); MS-ESI (m/z) 328 [M+H]$^+$.

3-Phenyl-3-(1-phenyl-1H-indol-3-yl)propanoic acid [Compound 8]: $^1$H NMR (CDCl$_3$, 500 MHz): δ 7.53-7.45 (m, 5H), 7.37-7.33 (m, 3H), 7.29-7.25 (m, 2H), 7.20-7.16 (m, 3H), 7.06 (t, J=7.9 Hz, 1H), 4.83 (t, J=7.3 Hz, 1H), 3.22 (dd, J=15.6, 7.34 Hz, 1H), 3.08 (dd, J=15.6, 7.65 Hz, 1H); MS-ESI (m/z) 342 [M+H]$^+$.

2-(Phenyl(1-phenyl-1H-indol-3-yl)methyl)malonic acid [Compound 9]: $^1$H NMR (CDCl$_3$, 500 MHz): δ 7.54 (d, J=7.9, 1H), 7.50-7.43 (m, 5H), 7.38-7.37 (3H), 7.34-7.31 (m, 1H), 7.25-7.22 (m, 2H), 7.17-7.13 (m, 2H), 7.05 (t, J=7.6 Hz, 1H), 5.08 (d, J=11.3 Hz, 1H), 4.32 (d, J=11.6 Hz, 1H); MS-ESI (m/z) 386 [M+H]$^+$.

3-Ethoxy-3-oxo-2-(phenyl(1-phenyl-1H-indol-3-yl) methyl)propanoic acid [Compound 10]: $^1$H NMR (CDCl$_3$, 500 MHz): δ 7.53 (d, J=8.0 Hz, 1H), 7.50-7.45 (m, 5H), 7.41 (s, 1H), 7.38 (d, J=7.8 Hz, 2H), 7.34-7.31 (m, 1H), 7.25-7.22 (m, 2H), 7.15 (q, J=7.6 Hz, 2H), 7.05 (t, J=7.1 Hz, 1H), 5.07 (d, 11.4 Hz, 1H), 4.32 (d, J=11.9 Hz, 1H), 3.93 (q, J=7.3 Hz, 2H), 0.94 (t, J=7.4 Hz, 3H); MS-ESI (m/z) 414 [M+H]$^+$.

(±)-2-Methyl-4-phenyl-4-(1-phenyl-1H-indol-3-yl)butanoic acid [(±)-Compound 11, cis]: $^1$H NMR (CDCl$_3$, 500 MHz): δ 7.54-7.48 (m, 5H), 7.38-7.35 (m, 2H), 7.33-7.28 (m, 3H), 7.21-7.15 (m, 3H), 7.08-7.05 (m, 1H), 4.35 (dd, J=9.0, 6.7 Hz, 1H), 2.76-2.70 (m, 1H), 2.57-2.44 (m, 1H), 2.10-2.04 (m, 1H), 1.23 (d, J=6.9 HZ, 3H); MS-ESI (m/z) 370 [M+H]$^+$.

(±)-2-Methyl-4-phenyl-4-(1-phenyl-1H-indol-3-yl)butanoic acid [(±)-Compound 12, trans]: $^1$H NMR (CDCl$_3$, 500 MHz): δ 7.52-7.48 (m, 5H), 7.38-7.36 (m, 2H), 7.33-7.26 (m, 3H), 7.19-7.15 (m, 3H), 7.08-7.05 (m, 1H), 4.35 (t, J=8.0, 1H), 2.60-2.54 (m, 1H), 2.52-2.45 (m, 1H), 2.31-2.25 (m, 1H), 1.29 (d, J=7.3 Hz, 3H); MS-ESI (m/z) 370[M+H]$^+$.

Ethyl 4-phenyl-4-(1-phenyl-1H-indol-3-yl)butanoate [Compound 13]: $^1$H NMR (CDCl$_3$, 500 MHz): δ 7.54-7.48 (m, 6H), 7.36-7.27 (m, 5H), 7.24-7.16 (m, 3H), 7.08-7.05 (m, 1H), 4.29 (t, J=7.3 Hz, 1H), 4.14 (q, J=6.7 Hz, 2H), 2.60-2.54 (m, 1H), 2.39-2.35 (m, 3H), 1.23 (t, J=7.3 Hz, 3H); MS-ESI (m/z) 384 [M+H]$^+$.

Methyl 4-phenyl-4-(1-phenyl-1H-indol-3-yl)butanoate [Compound 14]: $^1$H NMR (CDCl$_3$, 400 MHz): 7.55-7.50 (m, 6H), 7.35-7.30 (m, 5H), 7.23-7.18 (m, 3H), 7.09-7.07 (m, 1H), 4.27-4.25 (m, 1H), 3.85 (s, 3H), 2.62-2.57 (m, 1H), 2.43-2.35 (m, 3H); MS-ESI (m/z) 397 [M+H]$^+$.

(Z)-4-phenyl-4-(1-phenyl-1H-indol-3-yl)but-2-enoic acid [Compound 15]: $^1$H NMR (CDCl$_3$, 500 MHz): δ 7.55 (d, J=8.3 Hz, 1H), 7.51-7.49 (m, 4H), 7.40-7.39 (m, 3H), 7.35-7.30 (m, 3H), 7.25-7.23 (m, 1H), 7.19 (t, J=7.7 Hz, 1H), 7.13 (s, 1H), 7.06 (t, J=7.8 Hz, 1H), 6.84 (t, J=11.0 Hz, 1H), 6.51 (d, J=10.7 Hz, 1H), 5.97 (d, J=11.3 Hz, 1H); MS-ESI (m/z) 354 [M+H]$^+$.

(E and Z)-4-Phenyl-4-(1-phenyl-1H-indol-3-yl)but-3-enoic acid [Compound 16; mix of trans:cis (94:6)]: $^1$H NMR (CDCl$_3$, 500 MHz): δ 7.69 (d, J=8.2 Hz, 0.07H), 7.60 (d, J=8.2 Hz, 1H), 7.57-7.52 (m, 4H), 7.49-7.46 (m, 0.21H), 7.44-7.41 (m, 3H), 7.38-7.32 (m, 1H), 7.31-7.28 (m, 3H), 7.23-7.20 (m, 1H), 7.13-7.11 (m, 1H), 7.06-7.03 (m, 1H), 6.41 (t, J=7.8 Hz, 0.06H), 6.33 (t, J=7.4 Hz, 1H), 3.40 (d, J=7.6 Hz, 2H), 3.28 (d, J=7.6 Hz, 0.14 Hz) MS-ESI (m/z) 354 [M+H]$^+$.

4-(6-Methyl-1-phenyl-1H-indol-3-yl)-4-phenylbutanoic acid [Compound 17]: $^1$H NMR (CDCl$_3$, 500 MHz): δ 7.52-7.48 (m, 4H), 7.35-7.32 (m, 5H), 7.29 (t, J=7.6 Hz, 2H), 7.20-7.17 (m, 1H), 7.14 (s, 1H), 6.90 (d, J=8.0 Hz, 1H), 4.23 (t, J=8.04 Hz, 1H), 2.62-2.55 (m, 1H), 2.48-2.32 (m, 6H); MS-ESI (m/z) 370 [M+H]$^+$.

4-(1-Penzyl-1H-indol-3-yl)-4-phenylbutanoic acid [Compound 18]: $^1$H NMR (CDCl$_3$, 500 MHz): δ 7.43 (d, J=8.4 Hz, 1H), 7.31-7.27 (m, 7H), 7.23-7.16 (m, 2H), 7.13-7.08 (m, 3H), 7.01-6.98 (m, 2H), 5.29 (s, 2H), 4.22 (t, J=8.0 Hz, 1H), 2.57-2.50 (m, 1H), 2.44-2.28 (m, 3H); MS-ESI (m/z) 370 [M+H]$^+$.

5-Phenyl-5-(1-phenyl-1H-indol-3-yl)pentanoic acid [Compound 19]: $^1$H NMR (CDCl$_3$, 500 MHz): δ 7.54-7.47 (m, 6H), 7.34-7.31 (m, 3H), 7.29-7.26 (m, 2H), 7.22 (s, 1H), 7.19-7.15 (m, 2H), 7.06 (t, J=7.4 Hz, 1H), 4.22 (t, J=7.4 Hz, 1H), 2.40 (t, J=7.44 Hz, 2H), 2.32-2.25 (m, 1H), 2.13-2.05 (m, 1H), 1.81-1.75 (m, 1H), 1.72-1.65 (m, 1H); MS-ESI (m/z) 370 [M+H]$^+$.

6-Phenyl-6-(1-phenyl-1H-indol-3-yl)hexanoic acid [Compound 20]: $^1$H NMR (CDCl$_3$, 500 MHz): δ 7.54-7.47 (m, 6H), 7.34-7.31 (m, 3H), 7.29-7.28 (m, 2H), 7.19-7.15 (m, 3H), 7.06 (t, J=7.6 Hz, 1H), 4.20 (t, J=7.2 Hz, 1H), 2.33 (t, J=8.0 Hz, 2H), 2.29-2.22 (m, 1H), 2.10-2.03 (m, 1H), 1.76-1.63 (m, 2H), 1.51-1.44 (m, 1H), 1.41-1.35 (m, 1H); MS-ESI (m/z) 384 [M+H]$^+$.

4-Phenyl-4-(1-(pyridin-2-yl)-1H-indol-3-yl)butanoic acid [Compound 21]: $^1$H NMR (CDCl$_3$, 500 MHz): δ 8.57 (dd, J=4.8, 1.1 Hz, 1H), 8.10 (d, J=8.0 Hz, 1H), 7.84-7.80 (m, 1H), 7.66 (s, 1H), 7.51 (d, J=8.0 Hz, 1H), 7.44 (d, J=8.0 Hz, 1H), 7.36 (s, 1H), 7.34 (s, 1H), 7.28 (t, J=7.7 Hz, 2H), 7.24-7.23 (m, 1H), 7.20-7.15 (m, 2H), 7.09 (t, J=7.5 Hz, 1H), 4.25 (t, J=8.1 Hz, 1H), 2.65-2.58 (m, 1H), 2.47-2.37 (m, 3H); MS-ESI (m/z) 357 [M+H]$^+$.

4-Phenyl-4-(1-(pyridin-3-yl)-1H-indol-3-yl)butanoic acid [Compound 22]: $^1$H NMR (CDCl$_3$, 500 MHz): δ 8.84 (d, J=2.2 Hz, 1H), 8.58 (d, J=4.6 Hz, 1H), 7.87-7.85 (m, 1H), 7.51-7.46 (m, 3H), 7.36-7.34 (m, 2H), 7.30 (m, J=7.5 Hz, 2H), 7.23-7.20 (m, 3H), 7.10 (t, J=7.7 Hz, 1H), 4.27 (t, J=8.1 Hz, 1H), 2.65-2.59 (m, 1H), 2.46-2.35 (m, 3H); MS-ESI (m/z) 357 [M+H]$^+$.

4-Phenyl-4-(1-(pyridin-4-yl)-1H-indol-3-yl)butanoic acid [Compound 23]: $^1$H NMR (CDCl$_3$, 500 MHz): δ 8.69 (d, J=5.6 Hz, 2H), 7.69 (d, J=8.5 Hz, 1H), 7.50-7.47 (m, 3H), 7.35-7.30 (m, 5H), 7.24-7.20 (m, 1H), 7.13 (t, J=7.6 Hz, 1H), 4.26 (t, J=8.31 Hz, 1H), 2.65-2.59 (m, 1H), 2.45-2.34 (m, 3H); MS-ESI (m/z) 357 [M+H]$^+$.

4-Phenyl-4-(1-(thiophen-3-yl)-1H-indol-3-yl)butanoic acid [Compound 24]: $^1$H NMR (CDCl$_3$, 500 MHz): δ 7.52 (d, J=8.3 Hz, 1H), 7.47 (d, J=7.8 Hz, 1H), 7.44 (dd, J=5.2, 3.6 Hz, 1H), 7.34 (d, J=7.63 Hz, 2H), 7.31-7.27 (m, 4H), 7.21-7.19 (m, 3H), 7.07 (t, J=7.6 Hz, 1H), 4.25 (t, J=8.3 Hz, 1H), 2.57-2.63 (m, 1H), 2.45-2.34 (m, 3H); MS-ESI (m/z) 362 [M+H]$^+$.

4-phenyl-4-(1-(thiophen-2-yl)-1H-indol-3-yl)butanoic acid [Compound 25]: $^1$H NMR (CDCl$_3$, 500 MHz): δ 7.54 (d, J=6.4 Hz, 2H), 7.31-7.27 (m, 3H), 7.23-7.19 (m, 2H), 7.17-7.16 (m, 1H), 7.09-7.03 (m, 3H), 4.24 (t, J=7.38 Hz, 1H), 2.60-2.55 (m, 1H), 2.44-2.32 (m, 3H); MS-ESI (m/z) 362 [M+H]$^+$.

4-(1-(5-bromothiophen-2-yl)-1H-indol-3-yl)-4-phenylbutanoic acid [Compound 26]: $^1$H NMR (CDCl$_3$, 500 MHz): δ 7.51 (d, J=7.7 Hz, 1H), 7.46 (d, J=8.8 Hz, 1H), 7.35-7.30 (m, 4H), 7.24-7.21 (m, 2H), 7.12-7.09 (m, 2H), 7.03 (d, J=4.7 Hz, 1H), 6.83 (d, J=4.13 Hz, 1H), 4.23 (t, J=8.3 Hz, 1H), 2.62-2.55 (m, 1H), 2.44-2.41 (m, 2H), 2.38-2.33 (m, 1H). MS-ESI (m/z) 441 [M+H]$^+$.

4-(1H-Pndol-3-yl)-4-phenylbutanoic acid [Compound 28]: $^1$H NMR (CDCl$_3$, 500 MHz): δ 8.01 (bs, 1H), 7.43 (d, J=7.9 Hz, 1H), 7.35-7.27 (m, 5H), 7.19-7.13 (m, 2H), 7.08 (s, 1H), 7.02 (d, J=8.1 Hz, 1H), 4.22 (t, J=7.9 Hz, 1H), 2.60-2.53 (m, 1H), 2.43-2.33 (m, 3H); MS-ESI (m/z) 280 [M+H]$^+$.

4-(1-Penzoyl-1H-indol-3-yl)-4-phenylbutanoic acid [Compound 29]: $^1$H NMR (CDCl$_3$, 500 MHz): δ 8.28 (d, J=8.1 Hz, 1H), 7.75 (d, J=6.9 Hz, 2H), 7.62 (d, J=7.4 Hz, 1H), 7.55 (t, J=7.8 Hz, 2H), 7.35 (d, J=7.8 Hz, 1H), 7.33-7.27 (m, 5H), 7.24 (s, 1H), 7.22-7.17 (m, 2H), 4.13 (dd, J=8.8, 6.6 Hz, 1H), 2.49-2.42 (m, 1H), 2.38-2.34 (m, 2H), 2.28-2.22 (m, 1H); MS-ESI (m/z) 384 [M+H]$^+$.

Phenyl(1-phenyl-1H-indol-3-yl)methanol [Compound 30]: $^1$H NMR (CDCl$_3$, 500 MHz): δ 7.67-7.65 (m, 1H), 7.55-7.52 (m, 3H), 7.49-7.43 (m, 4H), 7.38-7.31 (m, 4H), 7.29-7.25 (m, 1H), 7.17-7.12 (m, 1H), 7.1 (d, J=1.0 Hz, 1H), 6.21 (d, J=2.6 Hz, 1H), 2.34 (d, J=3.4 Hz, 1H); MS-ESI (m/z) 300 [M+H]$^+$.

2-Phenyl-2-(1-phenyl-1H-indol-3-yl)ethan-1-ol [Compound 31]: $^1$H NMR (CDCl$_3$, 500 MHz): δ 7.54 (d, J=8.2 Hz, 1H), 7.56-7.54 (m, 5H), 7.45-7.36 (m, 4H), 7.30-7.23 (m, 3H), 7.10-7.07 (m, 1H), 4.52 (t, J=7.0 Hz, 1H), 4.27 (dd, J=10.7, 6.27 Hz, 1H), 4.19 (dd, J=10.7, 7.3 Hz, 1H); MS-ESI (m/z) 314 [M+H]$^+$.

3-Phenyl-3-(1-phenyl-1H-indol-3-yl)propan-1-ol [Compound 32]: $^1$H NMR (CDCl$_3$, 500 MHz): δ 7.54-7.49 (m, 6H), 7.37 (d, J=7.6, 2H), 7.35-7.32 (m, 1H), 7.29 (t, J=7.6 Hz, 1H), 7.22 (s, 1H), 7.20-7.16 (m, 2H), 7.07 (t, J=8.1 Hz, 1H), 4.45 (t, J=7.8 Hz, 1H), 3.75-3.66 (m, 2H), 2.51 (sext, J=6.8 Hz, 1H), 2.34-2.23 (m, 1H), 1.46 (s, 1H); MS-ESI (m/z) 328 [M+H]$^+$.

2-(Phenyl(1-phenyl-1H-indol-3-yl)methyl)propane-1,3-diol [Compound 33]: $^1$H NMR (CDCl$_3$, 500 MHz): δ 7.65 (d, J=7.6 Hz, 1H), 7.53-7.48 (m, 5H), 7.42 (d, J=7.2 Hz, 2H), 7.36-7.35 (m, 1H), 7.29-7.26 (m, 3H), 7.20-7.17 (m, 2H), 7.13-7.10 (m, 1H), 4.37 (d, J=11.2 Hz, 1H), 4.02 (d, J=9.8 Hz, 1H), 3.92-3.90 (m, 1H), 3.82 (d, J=9.8 Hz, 1H), 3.66-3.63 (m, 1H), 2.68-2.63 (m, 1H), 2.16-2.13 (m, 2H); MS-ESI (m/z) 358 [M+H]$^+$.

4-Phenyl-4-(1-phenyl-1H-indol-3-yl)butan-1-ol [Compound 34]: $^1$H NMR (CDCl$_3$, 500 MHz): δ 7.54-7.48 (m, 6H), 7.36-7.24 (m, 5H), 7.22 (s, 1H), 7.19-7.15 (m, 2H), 7.06 (t, J=7.34 Hz, 1H), 4.26 (t, J=7.7 Hz, 1H), 3.67 (t, J=6.4 Hz, 2H), 2.36-2.29 (m, 1H), 2.15-2.11 (m, 1H), 1.73-1.56 (m, 2H), 1.23 (s, 1H); MS-ESI (m/z) 342 [M+H]$^+$.

2-(5-Chloro-1-phenyl-1H-indol-3-yl)-2-phenylethan-1-ol [Compound 35]: $^1$H NMR (CDCl$_3$, 500 MHz): δ 7.51-7.42 (m, 4H), 7.36-7.30 (m, 6H), 7.25 (t, J=7.0 Hz, 1H), 7.12 (d, J=9.3 Hz, 1H), 6.43 (t, J=6.5 Hz, 1H), 4.24-4.15 (m, 2H), 1.67 (bs, 1H); MS-ESI (m/z) 349 [M+H]$^+$.

Phenyl-2-(1-phenyl-1H-indol-3-yl)acetonitrile [Compound 36]: $^1$H NMR (CDCl$_3$, 500 MHz): δ 7.54-7.45 (m, 8H), 7.39-7.29 (m, 4H), 7.24 (dt, J=7.3, 1.0 Hz, 1H), 7.15 (dt, J=6.9, 1.0 Hz, 1H), 5.43 (s, 1H); MS-ESI (m/z) 309 [M+H]$^+$.

3-Phenyl-3-(1-phenyl-1H-indol-3-yl)propanenitrile [Compound 37]: $^1$H NMR (CDCl$_3$, 500 MHz): δ 7.54-7.50 (m, 5H), 7.39-7.34 (m, 6H), 729-7.27 (m, 1H), 7.22-7.19 (m, 1H), 7.08 (t, J=7.4 Hz, 1H), 4.68 (t, J=7.2 Hz, 1H), 3.17 (dd, J=17.0, 7.2 Hz, 1H), 3.07 (dd, J=16.5, 7.2 Hz, 1H); MS-ESI (m/z) 323 [M+H]$^+$.

3-Phenyl-3-(1-phenyl-1H-indol-3-yl)propanamide [Compound 38]: $^1$H NMR (CDCl$_3$, 500 MHz): δ 7.53-7.46 (m, 6H), 7.38-7.2 (m, 5H), 7.21-7.16 (m, 3H), 7.07-7.04 (m, 1H), 5.43 (bs, 1H), 5.33 (bs, 1H), 4.82 (t, J=7.3 Hz, 1H), 3.13 (dd, J=14.6, 7.3 Hz, 1H), 2.93 (dd, J=14.2, 8.2 Hz, 1H); MS-ESI (m/z) 341 [M+H]$^+$.

1-Phenyl-3-(1-phenyl-2-(1H-tetrazol-5-yl)ethyl)-1H-indole [Compound 39]: $^1$H NMR (CDCl$_3$, 500 MHz): δ 7.54-7.48 (m, 3H), 7.45-7.43 (m, 3H), 7.36-7.30 (m, 5H), 7.25-7.19 (m, 3H), 7.08 (t, J=7.5 Hz, 1H), 4.78 (t, J=8.1 Hz, 1H), 3.95 (dd, J=15.1, 7.3 Hz, 1H), 3.73 (dd, J=15.0, 7.8 Hz, 1H); MS-ESI (m/z) 366 [M+H]+.

Phenyl(1-phenyl-1H-indol-3-yl)methanone [Compound 40]: $^1$H NMR (CDCl$_3$, 500 MHz): δ 8.51 (d, J=8.3 Hz, 1H), 7.88-7.87 (m, 2H), 7.77 (s, 1H), 7.57-7.49 (m, 8H), 7.47-7.44 (m, 1H), 7.40-7.33 (m, 2H); MS-ESI (m/z) 298 [M+H]$^+$.

4-Methyl-5-phenyl-5-(1-phenyl-1H-indol-3-yl)pentan-2-one [Compound 41]: $^1$H NMR (CDCl$_3$, 500 MHz): δ 7.62 (d, J=7.7 Hz, 1H), 7.53-7.46 (m, 5H), 7.38-7.37 (m, 2H), 7.35-7.32 (m, 1H), 7.30 (s, 1H), 7.28-7.25 (m, 2H), 7.20-7.10 (m, 3H), 3.97 (d, J=10.3 Hz, 1H), 3.04-2.99 (m, 1H), 2.77 (dd, J=16.7, 2.6 Hz, 1H), 2.36 (dd, J=16.9, 9.1 Hz, 1H), 2.03 (s, 3H), 0.88 (d, 6.7 Hz, 3H); MS-ESI (m/z) 368 [M+H]$^+$.

4-Methyl-5-phenyl-5-(1-phenyl-1H-indol-3-yl)pentan-2-one [Compound 42]: $^1$H NMR (CDCl$_3$, 500 MHz): δ 7.57 (d, J=7.8 Hz, 1H), 7.53-7.50 (m, 5H), 7.37-7.32 (m, 4H), 7.27-7.24 (m, 2H), 7.16 (q, J=7.5, 2H), 7.09 (t, J=7.7 Hz, 1H), 4.02 (d, J=10.0 Hz, 1H), 3.04-2.95 (m, 1H), 2.47 (dd, J=16.4, 3.0 Hz, 1H), 2.24 (dd, J=17.1, 9.6 Hz, 1H), 2.00 (s, 3H), 0.88 (d, J=6.3 Hz, 3H); MS-ESI (m/z) 368 [M+H]$^+$.

Example 3: Functional Evaluation of GAT 1102 Analogs

GAT1102 analogs were functionally evaluated using the procedures described below. Results obtained are shown in the Table 1 that follows the procedures.

PathHunter CB1 β-Arrestin Assay: Chinese hamster ovary K1 (CHO-K1)-PathHunter hCB1 β-arrestin cells (DiscoveRx, Fremont, CA) were seeded at 5000 cells/well in 384-well plates 24 h before use and incubated at 37° C., 5% CO$_2$. Compounds were dissolved in dimethyl sulfoxide (DMSO) and diluted in optimized cell culture (OCC) media. Agonist EC80 was determined directly from an agonist dose—response curve (data not shown). The CP55,940 EC80 was 31.1±0.47 nM (mean±SEM, n=3 independent experiments). Five microliters of allosteric modulator or vehicle solution was added to each well at the appropriate concentrations and incubated for 30 min. Five microliters of agonist was then added to each well followed by a 90 min incubation. Fifteen microliters of detection reagent was then added followed by further 60 min incubation at room temperature. Chemiluminescence was measured on a standard luminescence plate reader as relative light units (RLU). Basal RLU was defined as zero. Results were calculated as the percentage inhibition of CP55,940 maximal effect. Data were analyzed using the fourparameter variable-slope and allosteric EC50 shift nonlinear regression equations in Prism 5.0 (GraphPad, San Diego, CA). The results of this analysis are presented as Emax±SEM, and EC50 (nM) with 95% CI.

Figure 4:
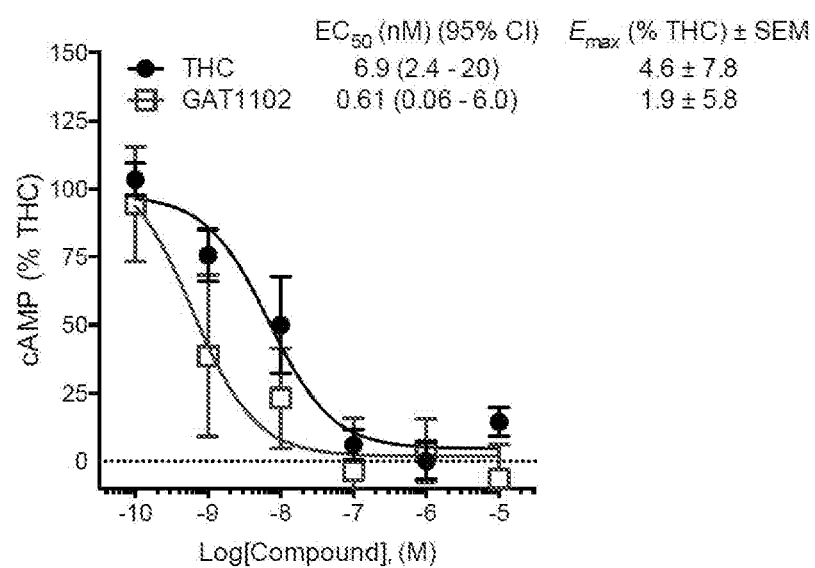
FIG. 4 is a graph showing variation in cAMP levels in response to administration of GAT1102 or THC (tetrahydrocannabinol).

HitHunter cAMP assay: Inhibition of forskolin-stimulated cAMP was determined using the DiscoveRx HitHunter assay in hCB1R CHO-K1 cells. Cells (20,000 cells/well in low-volume 96 well plates) were incubated overnight in Opti-MEM (Invitrogen) containing 1% FBS at 37° C. and 5% CO$_2$. Following this, Opti-MEM media was removed and replaced with cell assay buffer (DiscoveRx) and cells were co-treated at 37° C. with 10 μM forskolin and hCB1R ligands (0.10 nM-10 μM) for 30 min or 90 min cAMP antibody solution and cAMP working detection solutions were then added to cells according to the manufacturer's directions (DiscoveRx®) and cells were incubated for 60 min at room temperature. cAMP solution A was added according to the manufacturer's directions (DiscoveRx®) and cells were incubated for an additional 60 min at room temperature before chemiluminescence was measured on a Cytation 5 plate reader (top read, gain 200, integration time 10,000 ms). Results are shown in FIG. 4.

TABLE 1

| | CB1 | | | | CB2 | |
|---|---|---|---|---|---|---|
| | PAM mode | | Agonist mode | | Agonist mode | |
| Compound | cAMP EC$_{50}$ (μm) [E$_{max}$ (%)] | β-Arrestin EC$_{50}$ (μm) [E$_{max}$ (%)] | cAMP EC$_{50}$ (μm) [E$_{max}$ (%)] | β-Arrestin EC$_{50}$ (μm) [E$_{max}$ (%)] | cAMP EC$_{50}$ (μm) [E$_{max}$ (%)] | β-Arrestin EC$_{50}$ (μm) [E$_{max}$ (%)] |
| GAT211 (reference) | 0.318 (73) | 0.313 (59) | 0.361 (94) | >10 (14) | >10 (0) | >10 (0) |
| Compound 7 | 4.18 (78.89) | >10 (0) | NA | NA | NA | NA |
| Compound 8 | 0.509 (144) | >10 (0) | NA | NA | NA | NA |
| Compound 9 | 1.28 (158) | >10 (0) | NA | NA | NA | NA |
| Compound 10 | >10 (6.98) | >10 (4.59) | NA | NA | NA | NA |
| GAT1102 | 0.419 (101) | >10 (0) | 0.356 (89) | >10 (0) | 0.271 (81) | >10 (0) |
| Compound 11 | 1.89 (100) | >10 (0) | 1.26 (62) | >10 (0) | NA | NA |
| Compound 12 | 0.704 (101) | >10 (0) | 1.06 (60) | >10 (0) | NA | NA |
| Compound 13 | >10 (0) | >10 (0) | NA | NA | NA | NA |
| Compound 14 | NA | NA | NA | NA | NA | NA |
| Compound 15 | 0.639 (84) | >10 (0) | 0.506 (86) | >10 (0) | 1.05 (81) | >10 (0) |
| Compound 16 | 0.934 (104) | >10 (0) | 0.689 (94) | >10 (0) | 0.359 (80) | >10 (0) |
| Compound 17 | 1.44 (93) | >10 (0) | 1.25 (73) | >10 (0) | 1.00 (74) | >10 (0) |
| Compound 18 | 0.61 (97) | >10 (0) | 1.036 (87) | >10 (0) | 0.407 (64) | >10 (0) |
| Compound 19 | 1.42 (98) | >10 (0) | 0.827 (98) | >10 (0) | 0.654 (95) | >10 (0) |
| Compound 20 | 1.09 (96) | >10 (0) | 0.355 (96) | >10 (0) | 0.505 (98) | >10 (0) |
| Compound 21 | 0.869 (96) | >10 (0) | 0.457 (95) | >10 (0) | 1.11 (85) | >10 (0) |
| Compound 22 | 1.00 (109) | >10 (0) | 0.831 (87) | >10 (0) | 0.731 (68) | >10 (0) |
| Compound 23 | 1.063 (104) | >10 (0) | 0.357 (83) | >10 (0) | 0.570 (78) | >10 (0) |
| (+)-GAT1102 | NA | NA | NA | NA | NA | NA |
| (−)-GAT1102 | NA | NA | NA | NA | NA | NA |
| Compound 24 | NA | NA | NA | NA | NA | NA |
| Compound 25 | NA | NA | NA | NA | NA | NA |
| Compound 26 | NA | NA | NA | NA | NA | NA |
| Compound 27 | NA | NA | NA | NA | NA | NA |
| Compound 28 | 4.35 (71) | >10 (0) | 9.81 (60) | >10 (0) | >10 (29) | >10 (0) |

TABLE 1-continued

| | CB1 | | | | CB2 | |
| --- | --- | --- | --- | --- | --- | --- |
| | PAM mode | | Agonist mode | | Agonist mode | |
| Compound | cAMP $EC_{50}$ (μm) [$E_{max}$ (%)] | β-Arrestin $EC_{50}$ (μm) [$E_{max}$ (%)] | cAMP $EC_{50}$ (μm) [$E_{max}$ (%)] | β-Arrestin $EC_{50}$ (μm) [$E_{max}$ (%)] | cAMP $EC_{50}$ (μm) [$E_{max}$ (%)] | β-Arrestin $EC_{50}$ (μm) [$E_{max}$ (%)] |
| Compound 29 | 0.709 (114) | >10 (0) | 0.596 (92) | >10 (0) | 0.419 (76) | >10 (0) |
| Compound 30 | >10 (0) | >10 (0) | NA | NA | NA | NA |
| Compound 31 | >10 (1.311) | >10 (0) | NA | NA | NA | NA |
| Compound 32 | >10 (27.14) | >10 (0) | NA | NA | NA | NA |
| Compound 33 | NA | NA | NA | NA | NA | NA |
| Compound 34 | >10 (0) | >10 (5) | NA | NA | NA | NA |
| Compound 35 | >10 (2.814) | >10 (0) | NA | NA | NA | NA |
| Compound 38 | >10 (27.1) | >10 (0) | NA | NA | NA | NA |
| Compound 39 | 0.423 (94) | >10 (0) | NA | NA | NA | NA |
| Compound 40 | >10 (11.67) | >10 (0.273) | NA | NA | NA | NA |
| Compound 41 | >10 (0) | >10 (0) | >10 (0) | >10 (0) | >10 (34) | >10 (0) |
| Compound 42 | >10 (0) | >10 (0) | >10 (0) | >10 (0) | >10 (0) | >10 (0) |

NA: Not Available

Example 4: Electrophysiological Characterization of GAT1102

Figures 2A, 2B, 2C:
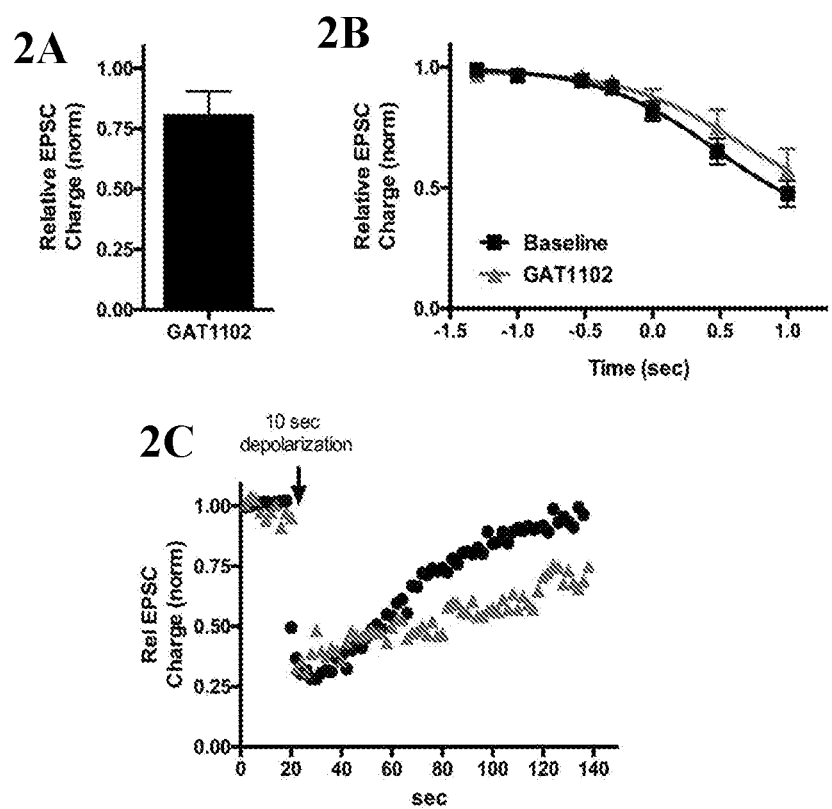
FIGS. 2A, 2B, and 2C are graphs showing that GAT1102 exhibits both agonist and PAM properties.

The compound GAT1102 exhibited agonist properties in some cells. Averaged direct inhibition of excitatory postsynaptic currents (EPSCs) upon applying 1 μM GAT1102 can be seen in FIG. 2A. There was some evidence of a modest GAT1102 PAM effect in the form of a slowing recovery for depolarization-induced suppression of excitation (DSE) but in most cases this was occluded by the direct inhibition (agonism). Depolarization response curves before and after GAT1102 treatment are shown in FIG. 2B. FIG. 2C shows sample DSE time course from a cell showing an enhanced DSE inhibition after GAT1102 treatment, which is consistent with a PAM-like response.

Example 5: In Vivo Evaluation of GAT1102 in TOP Studies

Animals

Normotensive C57Bl/6J mice and Sh3pxd2b mice were obtained from Jackson Laboratory (Bar Harbor, Maine). The Sh3pxd2b mice were bred in house, and their progenies with abnormal phenotypical morphology, identified as a nee mice, were used for experiments.

Drugs

GAT1102 was dissolved in a standard vehicle containing 2% DMSO (Sigma Aldrich, Oakville, ON, Canada) and 4% Tween-20 (Sigma-Aldrich) in Tocrisolve (Bio-Techne, Minneapolis, MN). In normotensive C57Bl/6J animals WIN55,212-2 (0.25%) was dissolved together with GAT1102 (0.2%). In the ocular hypertensive nee mice GAT 1102 was administered alone at 0.2%. Drug was administered topically (5 μl/eye) to the right eyes, while the left eyes received vehicle control (2% DMSO+4% Tween-20 in Tocrisolve; 5 μl).

IOP Measurements

Figure 3A:
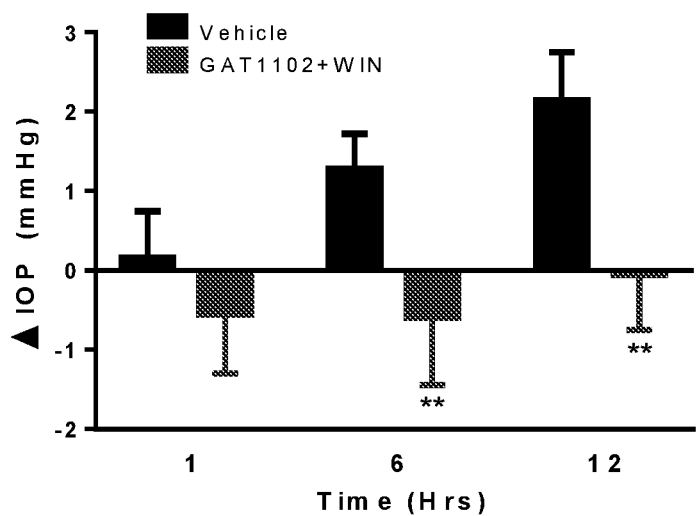
FIGS. 3A and 3B show the effects of PAM GAT1102 on TOP.
Figure 3B:
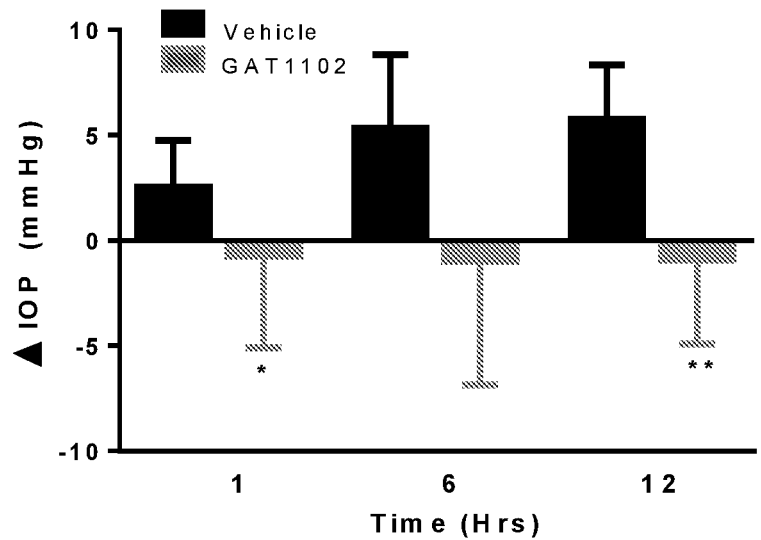

Mice were anesthetized with the isoflurane (3% induction, 1.5% maintenance). The intraocular pressure (TOP) was measured with a handheld rebound tonometer (Tonolab, Icare, Finland), calibrated to mouse. Ten recordings were taken for each eye and then averaged. The IOP readings were taken at time 0 (baseline), 1, 6 and 12 hrs after the drug/vehicle administration. All the measurements were taken at the same time of the day, in order to minimize variability related to diurnal changes in IOP. See FIG. 3A-3B Data was analyzed by GraphPad version 6.0 (GraphPad Software, Inc., La Jolla, CA). Paired t-tests were used to compare between eyes of the same animal. A P value of <0.05 was considered significant. The IOP-lowering effect of subthreshold WIN55,212-2 (WIN) was found to be potentiated by the GAT1102 in normotensive C57Bl/6J mice. IOP was significantly lower in eyes receiving 0.2% GAT1102 combined with subthreshold 0.25% WIN at 6 and 12 hrs after topical administration compared to vehicle (n=5) See FIG. 3A. GAT1102 (0.2%) significantly decreased IOP in ocular hypertensive nee mice at 1 and 12 hrs after topical administration (n=6). Values are represented as a change in IOP from the baseline (time 0). See FIG. 3B The animal data make a compelling case for the utility of GAT1102 for reduced increased intraocular pressure associated with glaucoma. Based on our previous findings with GAT211, a CB1 PAM, we strongly believe that the class of compounds disclosed in this patent application will be useful for treating several other disorders mediated through CB1 receptor.

REFERENCES

Cairns, E. A.; Szczesniak, A. M.; Straiker, A. J.; Kulkarni, P. M.; Pertwee, R. G.; Thakur, G. A.; Baldridge, W. H.; Kelly, M. E. M. *Journal of ocular pharmacology and therapeutics: the official journal of the Association for Ocular Pharmacology and Therapeutics* 2017, 33, 582.

Caitlin E. Scott and Debra A. Kendall, Assessing Allosteric. Modulation of CB1 at the Receptor and Cellular Levels, Methods in Enzymology Volume 593, 2017, Pages 317-342.

Ignatowska-Jankowska, B. M.; Baillie, G. L.; Kinsey, S.; Crowe, M.; Ghosh, S.; Owens, R. A.; Damaj, I. M.; Poklis, J.; Wiley, J. L.; Zanda, M.; Zanato, C.; Greig, I. R.; Lichtman, A. H.; Ross, R. A. *Neuropsychopharmacol* 2015, 40, 2948.

Laprairie, R. B.; Kulkarni, A. R.; Kulkarni, P. M.; Hurst, D. P.; Lynch, D.; Reggio, P. H.; Janero, D. R.; Pertwee, R. G.; Stevenson, L. A.; Kelly, M. E.; Denovan-Wright, E. M.; Thakur, G. A. *ACS chemical neuroscience* 2016, 7, 776.

Paula Morales, Pilar Goya, Nadine Jagerovic, and Laura Hernandez-Folgado, *Cannabis and Cannabinoid Research*, Volume 1.1, 2016, pages 22-30.

Mitjavila, J.; Yin, D.; Kulkarni, P. M.; Zanato, C.; Thakur, G. A.; Ross, R.; Greig, I.; Mackie, K.; Straiker, A. *Pharmacological research* 2018, 129, 475.

Slivicki, R. A.; Xu, Z.; Kulkarni, P. M.; Pertwee, R. G.; Mackie, K.; Thakur, G. A.; Hohmann, A. G. *Biological psychiatry* 2017, pii: S0006-3223(17)31761-4.

What is claimed is:

1. A compound having a structure according to Formula I

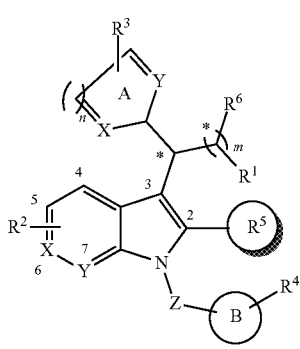

Formula I wherein
- X and Y are CH;
- Z is $(CH_2)_k$, and k is 0 to 4;
- A is an unsaturated carbocyclic ring and n is 2;
- B is phenyl or a 5 to 6 membered heteroaryl ring;
- $R^1$ is H, OH, $=CH_2$, or C1 to C5 alkyl, linear or branched, optionally substituted with $CO_2H$, $CONH_2$, or $-C\equiv C-$;
- $R^2$ is H, halogen, or alkyl;
- $R^4$ is H, halogen, alkoxy, OH, alkyl, haloalkyl, optionally substituted, alkyne, $NO_2$, CN, $CO_2R$, $NR_2$, a deuterated alkyl group, a five- or six-membered heterocyclic ring, a (hetero)aromatic ring, or $SO_2NHR$, wherein R is independently H or alkyl, optionally substituted;
- $R^3$ is H;
- $R^5$ is H;
- $R^6$ is $CO_2H$; $(CHR^7)_pCO_2R^7$; CN; $CONH_2$; alkoxy; $CONR^7R^8$; aryl; heterocyclic ring; $CH=CHCO_2R^7$; or $(CHR^7)_yCOR^7$; wherein $R^7$ and $R^8$, including each of $R^7$, is independently H or alkyl, optionally substituted, p is 2 to 4 and y is 0 to 4;
- * represents a chiral center; and
- m is 0 to 5, with the proviso that, when m=0, $R^1$ and $R^6$ are bonded to the atom marked with *.

2. The compound of claim 1, wherein $R^6$ is $CO_2H$.

3. The compound of claim 1, wherein $R^6$ is $CO_2H$ and m is 1.

4. The compound of claim 1, wherein each of $R^1$ and $R^6$ is $CO_2H$.

5. The compound of claim 1, wherein each of $R^1$ and $R^6$ is $CO_2H$ and m is 1.

6. The compound of claim 1, wherein $R^1$ is $CH_2OH$ and m is 1.

7. The compound of claim 1, wherein each of $R^1$ and $R^6$ is $CH_2OH$ and m is 1.

8. The compound of claim 1, wherein $R^6$ is a heterocyclic ring.

9. The compound of claim 8, wherein the heterocyclic ring is tetrazole.

10. The compound of claim 1, wherein $R^6$ is $CH_2COR^7$ and $R^7$ is alkyl and m is 1.

11. The compound of claim 10, wherein $R^1$ is H.

12. The compound of claim 10, wherein each of $R^1$ and $R^7$ is $CH_3$.

13. A compound of claim 1 having a structure selected from the group consisting of

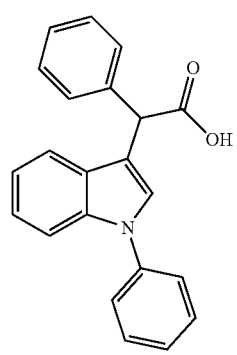

Compound 7

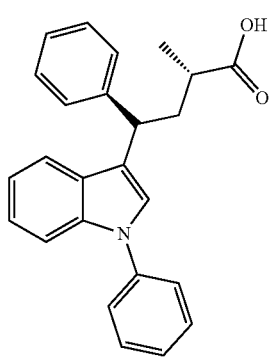

Compound 12

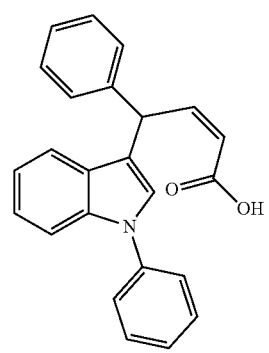

Compound 15

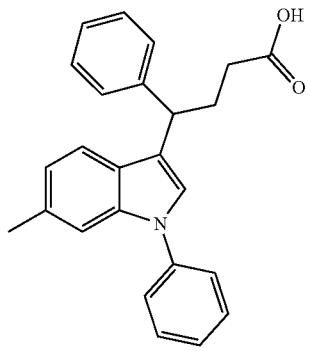

Compound 17

Compound 18
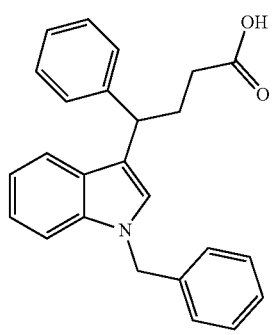
Compound 19
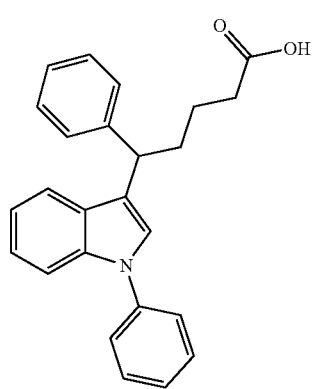
Compound 20
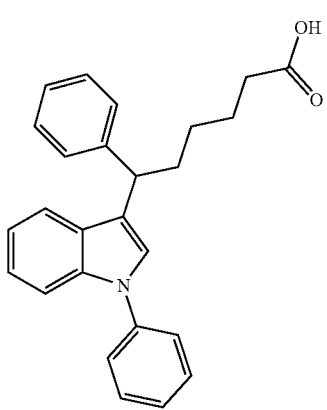
(+)-GAT1102
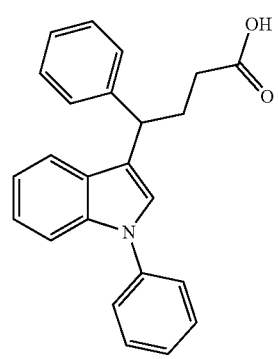
(−)-GAT1102
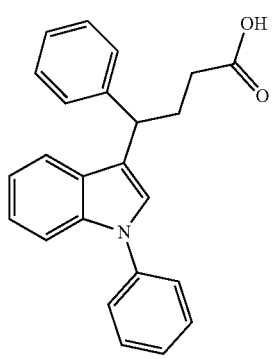
Compound 21
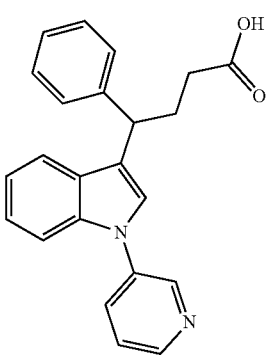
Compound 22
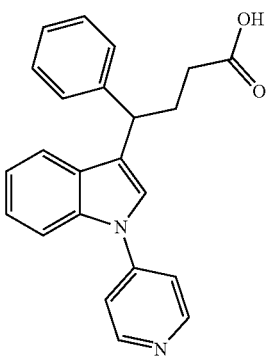
Compound 23

Compound 24
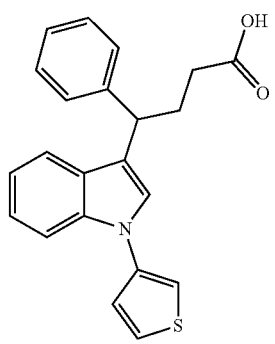
Compound 25
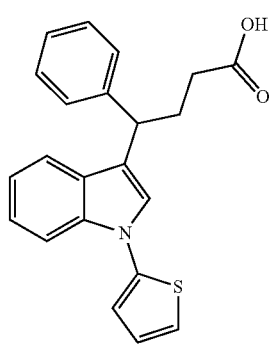
Compound 26
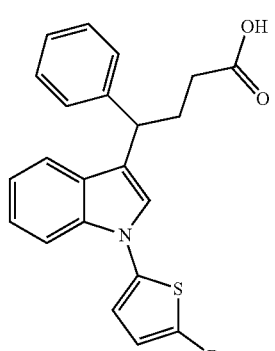
Compound 27
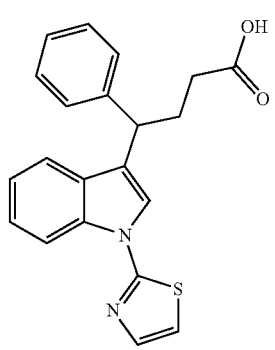
Compound 38
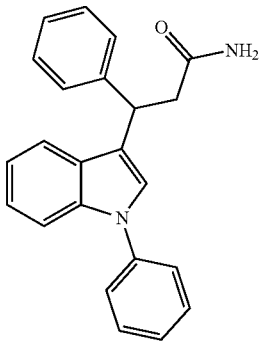
Compound 41
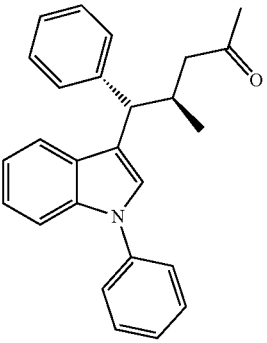
Compound 42
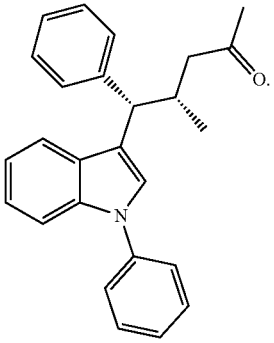
14. The compound of claim 1 that binds to a CB1 receptor.
15. The compound of claim 14 that is a positive allosteric modulator.
16. The compound of claim 1 that binds to a CB2 receptor.
17. A compound having a structure selected from the group consisting of
Compound 9
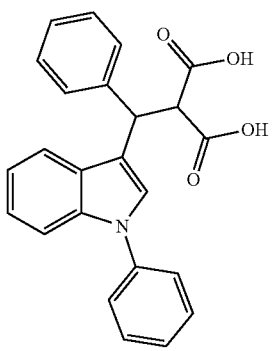

Compound 10

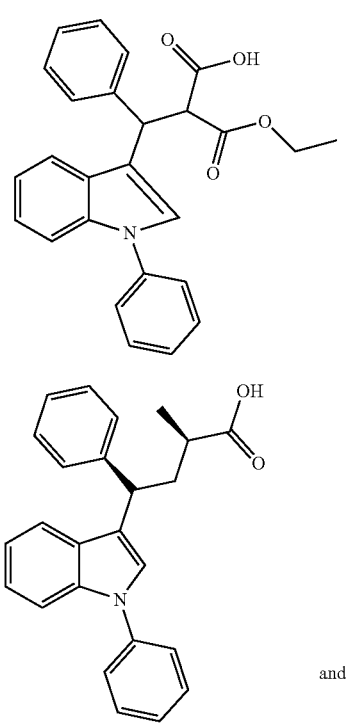

Compound 11 and

Compound 28

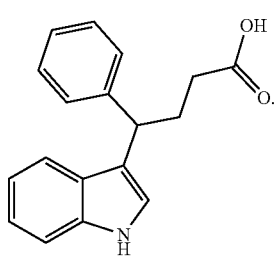

18. A pharmaceutical composition comprising a compound of claim 1 and one or more excipients.

19. A method of treating a medical condition selected from the group consisting of glaucoma, post-traumatic stress disorder, epilepsy, pain, neuropathic pain, a neurodegenerative disease, Huntington's disease, Alzheimer's disease, and Parkinson's disease, the method comprising administering the compound of claim 1 to a subject in need thereof.

* * * * *